(12) United States Patent
Hasan et al.

(10) Patent No.: US 11,470,892 B1
(45) Date of Patent: Oct. 18, 2022

(54) ANTIMICROBIAL METAL NANOPARTICLE MESH AIR FILTER

(71) Applicant: King Abdulaziz University, Jeddah (SA)

(72) Inventors: Prince Mufti Ziaul Hasan, Jeddah (SA); Javed Iqbal, Jeddah (SA); Numan Salah, Jeddah (SA); Ammar Melaibari, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/529,997

(22) Filed: Nov. 18, 2021

(51) Int. Cl.
*A41D 13/11* (2006.01)
*B01D 46/00* (2022.01)
(Continued)

(52) U.S. Cl.
CPC .......... *A41D 13/1192* (2013.01); *B01D 39/10* (2013.01); *B01D 46/0001* (2013.01);
(Continued)

(58) Field of Classification Search
CPC .... B01D 46/0028; B01D 39/10; B01D 39/12; B01D 46/0001; B01D 2239/0258; B01D 2239/0442; B01D 2239/1216; B01D 2239/1241; B01D 2279/00; B01D 2279/40; B01D 2279/50; B01D 2279/51;
(Continued)

(56) References Cited

U.S. PATENT DOCUMENTS

2010/0173070 A1* 7/2010 Niu .......................... H01B 1/00
427/304
2011/0206817 A1* 8/2011 Arnold .................. A23L 3/3454
427/427
(Continued)

FOREIGN PATENT DOCUMENTS

CN 106868559 A * 6/2017 ............. B01D 17/10
CN 106868559 A 6/2017
(Continued)

OTHER PUBLICATIONS

CN106868559A_ENG (Espacenet machine translation of Li) (Year: 2017).*
(Continued)

*Primary Examiner* — Gabriel E Gitman
(74) *Attorney, Agent, or Firm* — Oblon, McClelland, Maier & Neustadt, L.L.P.

(57) ABSTRACT

An antimicrobial air treatment device and a method of its construction. The antimicrobial air treatment device comprises an antimicrobial metal nanoparticle mesh comprising a steel support mesh and a layer of copper nanoparticles disposed on the steel support mesh. The antimicrobial air treatment device may be in the form of a facemask or a component of a moving air filtration system such as an HVAC system, an automobile cabin air filtration system, and an air purifier. The antimicrobial air treatment device may contain one or more filtration layers of filtration medium. The method of constructing the antimicrobial air treatment
(Continued)

device involves the preparation of the antimicrobial metal nanoparticle mesh by an electrodeposition technique.

14 Claims, 10 Drawing Sheets

(51) Int. Cl.
*A62B 23/02* (2006.01)
*B01D 39/10* (2006.01)
*C25D 3/38* (2006.01)
*C25D 5/36* (2006.01)

(52) U.S. Cl.
CPC ........ *B01D 46/0028* (2013.01); *A62B 23/025* (2013.01); *B01D 2239/0258* (2013.01); *B01D 2239/0442* (2013.01); *B01D 2239/1216* (2013.01); *B01D 2239/1241* (2013.01); *B01D 2279/50* (2013.01); *C25D 3/38* (2013.01); *C25D 5/36* (2013.01)

(58) Field of Classification Search
CPC ........ B01D 2279/65; B01D 2259/4508; B01D 2259/4533; B01D 2259/4541; A41D 13/11; A41D 13/1192; A62B 23/025; F24F 8/104; F24F 8/80; C25D 3/38; C25D 5/36; A61L 2300/606
See application file for complete search history.

(56) References Cited

U.S. PATENT DOCUMENTS

| | | | | |
|---|---|---|---|---|
| 2011/0262513 | A1* | 10/2011 | Fujimori | A61K 39/42 424/609 |
| 2018/0236393 | A1* | 8/2018 | Arney | B01D 46/523 |
| 2018/0243674 | A1* | 8/2018 | Gulrez | B01D 39/1623 |
| 2020/0359633 | A1* | 11/2020 | Takino | C09D 201/00 |
| 2021/0322802 | A1* | 10/2021 | Reed | A62D 9/00 |

FOREIGN PATENT DOCUMENTS

| | | | |
|---|---|---|---|
| CN | 108499160 A | 9/2018 | |
| EP | 1 996 744 B1 | 2/2011 | |
| GB | 2583104 A | 10/2020 | |
| IN | 202021044468 A | 11/2020 | |
| JP | 9-155124 A | 6/1997 | |
| JP | A1997155124 | * 6/1997 | B01D 39/14 |

OTHER PUBLICATIONS

JPA1997155124_ENG (WIPO machine translation of Ishibashi) (Year: 1997).*

Nik Norziehana Che ISA, et al., "Antibacterial activity of copper coating electrodeposited on 304 stainless steel substrate", AIP Conference Proceedings, vol. 1901, Issue 1, 2017, 4 pages (Abstract only).

Naveen Bharadishettar, et al., "Coating Technologies for Copper Based Antimicrobial Active Surfaces: A Perspective Review", Metals, vol. 11, No. 5, 711, Apr. 26, 2021, pp. 1-28.

* cited by examiner

ANTIMICROBIAL METAL NANOPARTICLE MESH AIR FILTER

BACKGROUND OF THE INVENTION

Field of the Invention

The present disclosure relates to an antimicrobial air treatment device comprising an antimicrobial metal nanoparticle mesh which comprises a steel support mesh and copper nanoparticles disposed on the steel support mesh as well as a method of preparing the device.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In the 21st century, following the antibiotic era that started with Alexander Fleming's discovery of penicillin in 1928, infections are still a major problem for human health. The COVID-19 pandemic has been arguably the biggest healthcare crisis the world has seen in a century. It has been infected people worldwide since the virus was first reported in December 2019 in China. According to the World Health Organization (WHO), there have been more than seven million confirmed cases of COVID-19, including 400,857 deaths as of 8 Jun. 2020. In addition to the public health impact of the disease, nationwide shutdowns and home-containment directives, while effective at slowing or halting the spread of the virus, have severely disrupted international and local economic activities. This large-scale public health crisis has inflicted immense damage on the global economy. In a report released in May 2020, the ADB (Asian Development Bank) estimated a loss of 8.8 trillion dollars to the global economy.

Public health experts across the world have urged that a critical part of addressing the pandemic is personal protection to prevent the spread of the virus. Since the first recorded uses in the $6^{th}$ century BC, facemasks have been an important tool in such personal protection. They have been viewed as a critical piece of personal protective equipment ever since the discovery of Brownian motion of dust particles by Robert Brown in 1827 and the confirmation of presence of bacteria in air by Louis Pasteur in 1861. While there are several measures discussed in guidelines from the WHO on infection control measures for the public such as hand hygiene, social distancing, and respiratory etiquette, the use of protective equipment, particularly facemasks have been viewed as possibly the most effective tools to combat the spread of COVID-19. Facemasks can be used either for protection of healthy persons (worn to protect oneself when in contact with an infected individual), or for source control (worn by an infected individual to prevent onward transmission).

Facemasks are typically described as effective at blocking respiratory droplets, small droplets (diameter approximately 1 to 1000 μm) of fluid which are shed during normal and/or abnormal respiration (e.g. talking, coughing, sneezing). Such droplets typically contain large amounts of viral particles if shed by infected individuals, even if such individuals are asymptomatic. Broadly speaking, facemasks can be divided into two categories: medical and non-medical facemasks. Different types of facemasks offer different levels of protection and are evaluated and regulated according to different standards. N95 respirators offer the highest level of protection against COVID-19 infection, followed by surgical grade masks, followed by largely unregulated cloth masks. Different aspects of the usage of facemasks like filtering characteristics, efficacy of reducing incoming or outgoing viral particles, estimated population impacts of widespread community facemask use, and sociological considerations for policies concerning facemask-wearing have been studied by a wide variety of researchers [Jeremy, et. al., Face Masks Against COVID-19: An Evidence Review, PNAS, 2021, 118, 4, e2014564118; MacIntyre, et. al., A rapid systematic review of the efficacy of face masks and respirators against corona viruses and other respiratory transmissible viruses for the community, healthcare workers and sick patients: International Journal of Nursing Studies, 2020, 108, 103629; and Stanley, et. al., Uncertainty surrounding the use of face masks in the community amid the COVID-19 pandemic International Journal of Nursing Studies, 2020, 108, 103651]. The WHO has issued separate guidelines for the use of facemasks in health care settings, for the general public, and during home care. Each of these scenarios is associated with different risk factors and has guidelines tailored for the details of the scenario. For example, there are separate, specific guidelines on infection prevention and control (IPC) strategies for healthcare settings such as emergency rooms versus long-term care facilities (LTCF) versus home care. These guidelines issued by the WHO include specifications for facemask features and characteristics, including choice of fabric, number and combination of layers, shape, coating and maintenance [WHO Interim Guidance: Advice on the use of masks in the context of COVID-19:5 Jun. 2020].

While facemasks are effective at mitigating direct person-to-person transmission via respiratory droplets, viral transmission may still occur, particularly indoors where such droplets may not be sufficiently diluted with other air or remain in a confined space for a long period of time. One strategy to mitigate such indoor spread is the use of HVAC filtering or air purifiers. Similar to facemasks, HVAC filters or air purifiers intercept viral particles, particularly those carried by respiratory droplets, before inhalation by an uninfected person.

Conventional filter materials and articles, however, simply trap respiratory droplets and the associated viral particles. Thus, the masks or filters themselves may still harbor viruses or other infectious agents. These materials may indeed be considered a biohazard, making disposal costly and arduous to perform safely.

One promising method of both increasing the efficiency of microbial removal by masks and HVAC filters and reducing the risk of infection from used air filters is to make the air filters themselves antimicrobial. There are two general strategies which can yield antimicrobial air filters: the air filter itself can be made of an antimicrobial material, or a surface of the air filter can coated with an antimicrobial material to create an antimicrobial surface with in the filter.

Various strategies have been employed for forming antimicrobial air filters. One such strategy is to incorporate a molecular or polymeric antimicrobial agent into the filter material. This incorporation can be achieved by, for example, mixing the antimicrobial agent into a polymer that forms the filter material, forming a coating on the filter material, or impregnating the filter material with the antimicrobial agent. For example, U.S. Pat. No. 5,288,298A discloses an antimicrobial air filter that has a layer of polymeric expanded foam filter media impregnated with a biostat type antimicrobial agent. U.S. Pat. No. 6,872,241B2 discloses an anti-pathogenic air filtration medium comprising a fibrous substrate whose fibers are coated with an anti-pathogenic polymer. KR101920847B1 discloses an antimicrobial mask filter comprising a zinc phthalocyanine disposed on an outer layer of the mask. Alternatively, inorganic materials may be used to form an antimicrobial air filter. Due to their inherent biocidal properties, copper-containing materials are considered to be among the best candidates for making antimicrobial surfaces [M. Hans, et. al., Physicochemical properties of copper important for its antibacterial activity and development of a unified model, Biointerphases, 2016, 11, 18902; G. Grass, et. al., Metallic copper as an antimicrobial surface, Appl. Environ. Microbiol., 2011, 77, 1541-1547; and J. A. Lemire, et. al., Antimicrobial activity of metals: mechanisms, molecular targets and applications, Nat. Rev. Microbiol., 2013, 11, 371-384]. This is especially true in environments where standard sanitization techniques are not sufficient to regulate the presence or proliferation of microorganisms (such as the porous interiors of air filters) or where pathogenic agents have established resistance to the antimicrobial compounds used [C. D. Salgado, et. al., Copper surfaces reduce the rate of healthcare-acquired infections in the intensive care unit, Infect. Control Hosp. Epidemiol., 2013, 34].

Copper can be oxidized when exposed to dry or wet air, but this does not affect its biocidal properties, making it acceptable for prolonged exposure under these conditions [M. Hans, et. al., Role of copper oxides in contact killing of bacteria, Langmuir, 2013, 29, 16160-16166]. Copper and copper oxides are generally considered non-toxic to humans, particularly by skin contact. Copper ions have the ability to cycle between $Cu^+$ and $Cu^{2+}$ at biologically relevant redox-potentials and $Cu^+$ is considerably more toxic to bacteria [A. B. Monk, et. al., Potent bactericidal efficacy of copper oxide impregnated non-porous solid surfaces, BMC Microbiol., 2014, 14, 57; and H. K. Abicht, et. al., Non-enzymic copper reduction by menaquinone enhances copper toxicity in *Lactococcus lactis* IL1403, Microbiol., 2013, 159, 1190-1197]. $Cu^+$ ions are Fenton active, meaning they can generate reactive oxygen species (ROS) when the further oxidization from $Cu^+$ to $Cu^{2+}$ occurs. These ROS can cause peroxidation and oxidation of proteins [C. E. Santo, et. al., Contribution of copper ion resistance to survival of *Escherichia coli* on metallic copper surfaces, Appl. Environ. Microbiol., 2008, 74, 977-986; and C. E. Santo, et. al., Bacterial killing by dry metallic copper surfaces, Appl. Environ. Microbiol., 2011, 77, 794-802].

Typically, copper or other metal-containing materials and nanomaterials are disposed upon or incorporated into fibers which make up filtration media present in the air filter. Such materials are commonly incorporated into the air filter using the methods described above. For example, US20150289573A1 discloses a face mask that includes a filter layer containing zeolite particles which release silver or copper ions disposed on the fibers of the filter layer. U.S. Pat. No. 8,303,693B2 discloses a filter facemask comprising fibers which contain antimicrobial nanoparticles attached to the fibers. KR200422088Y1 discloses a breathing implement comprising a textile made of knitted or woven silver-coated yarn. JP9155124A discloses an antibacterial metallic air filter comprising a three dimensional porous metallic sintered body. A huge focus of research into this area involves direct incorporation of inorganic materials, typically as nanoparticles, into the structure of a fibrous filter material. For a review of various methods and examples of the incorporation of antimicrobial substances (organic, inorganic, and polymeric) into fibrous materials, see Gao, et. al. [Y. Gao, et. al., Electrospun Antibacterial Nanofibers: Production, Activity, and In Vivo Applications, Journal of Applied Polymer Science, 2014, 40797].

These methods, however, suffer from disadvantages such as antimicrobial material detachment, coating degradation, and consumption of antimicrobial material. In the case of face masks in particular, such antimicrobials may not survive a cleaning procedure, limiting the masks to single-use. Nanoparticles attached to or entangled in fibrous filter materials may become dislodged, removing the antimicrobial activity of the filter and posing an inhalation risk to humans.

In view of the foregoing, it is an objective of the current disclosure to provide an antimicrobial air treatment device comprising an antimicrobial metal nanoparticle mesh which is made of a support mesh coated with antimicrobial metal nanoparticles.

SUMMARY OF THE INVENTION

The present disclosure relates to an antimicrobial air treatment device, comprising:

an antimicrobial metal nanoparticle mesh comprising a steel support mesh having a wire size of 15 to 40 µm, and copper nanoparticles having a mean particle size of 250 to 1000 nm which are present in a nanoparticle layer having a layer thickness of 10 to 16 µm disposed upon the steel support mesh, and one or more filtration layers, each comprising a filtration medium wherein the antimicrobial metal nanoparticle mesh has an opening size of 10 to 15 µm.

In some embodiments, the filtration medium is at least one selected from the group consisting of a woven fabric, a nonwoven fabric, a fiberglass, and a paper.

In some embodiments, the antimicrobial air treatment device further comprises a filter support layer.

In some embodiments, the filter support layer is at least one selected from the group consisting of a polymer mesh and a metal mesh.

In some embodiments, the antimicrobial air treatment device is a facemask comprising a main body comprising the an antimicrobial metal nanoparticle mesh and one or more filtration layers, wherein the main body is configured to fit over a portion of a person's face such that air which is inhaled or exhaled by the person passes through the facemask.

In some embodiments the antimicrobial air treatment device further comprises a stiffening member attached to, disposed upon, or integrated into an upper edge of the main body.

In some embodiments the antimicrobial air treatment device further comprises an antimicrobial mesh housing pouch in which the antimicrobial metal nanoparticle mesh is removably contained.

In some embodiments the antimicrobial air treatment device further comprises an outer protective layer and an inner comfort layer.

In some embodiments the antimicrobial air treatment device meets the requirements to be classified as a surgical mask according to ASTM F2100.

In some embodiments the antimicrobial air treatment device meets the requirements to be classified as an N95 respirator.

In some embodiments, antimicrobial air treatment device is configured to be a component of a moving air filtration system which is at least one selected from the group consisting of an HVAC system, an automobile cabin air filtration system, and an air purifier.

In some embodiments, the antimicrobial air treatment device meets requirements to be classified as a HEPA filter or ULPA filter by ISO 29463.

In some embodiments, the antimicrobial air treatment device meets requirements to be classified as a HEPA filter or ULPA by EN1822.

In some embodiments, the antimicrobial air treatment device further comprises a border.

The present disclosure also relates to a method of forming the antimicrobial air treatment device, the method comprising immersing the steel support mesh in a deposition solution, and electrodepositing the copper nanoparticles by applying a voltage to the steel support mesh of −0.25 to −0.05 V vs Ag/AgCl to form the antimicrobial metal nanoparticle mesh, wherein the deposition solution comprises a copper (II) salt and water and has a pH less than 5.

In some embodiments, the copper (II) salt is copper sulfate.

In some embodiments, the copper sulfate is present in the deposition solution at an initial concentration of 0.25 to 0.75 M.

In some embodiments, the deposition solution has a pH of 0.5 to 1.5.

In some embodiments, the electrodepositing is performed for 15 to 120 minutes.

In some embodiments, the electrodepositing is performed with a current of −40 to −80 mA after 30 to 60 sec.

BRIEF DESCRIPTION OF THE DRAWINGS

FIG. 3A is for 0.01 M, FIG. 3B is for 0.05 M, FIG. 3C is for 0.1 M, and FIG. 3D is for 0.5 M;

FIG. 4A is for −0.142 V and 0.01 M, FIG. 4B is for −0.158 V and 0.05 M, FIG. 4C is for −0.159 V and 0.1 M, and FIG. 4D is for −0.113 V and 0.5 M;

FIG. 5A is a bare stainless slide without metal nanoparticle coating, FIG. 5B shows metal nanoparticles deposited at 0.005 M, FIG. 5C shows metal nanoparticles deposited at 0.05 M, and FIG. 5D shows metal nanoparticles deposited at 0.5 M;

FIG. 6A shows the stainless steel mesh before metal nanoparticle deposition, FIG. 6B shows a mesh after deposition at 0.01 M, FIG. 6C shows a mesh after deposition at 0.05 M, FIG. 6D shows a mesh after deposition at 0.1 M, FIG. 6E shows a low magnification image of a mesh after deposition at 0.5 M, and FIG. 6F shows a high magnification image of a mesh after deposition at 0.5 M;

FIG. 7A shows a small selected area of interest, FIG. 7B shows the EDS spectrum from the area shown in FIG. 7A, FIG. 7C shows a large selected area of interest, and FIG. 7D shows the EDS spectrum from the area shown in FIG. 7C.

DETAILED DESCRIPTION OF THE INVENTION

Figure 1A:
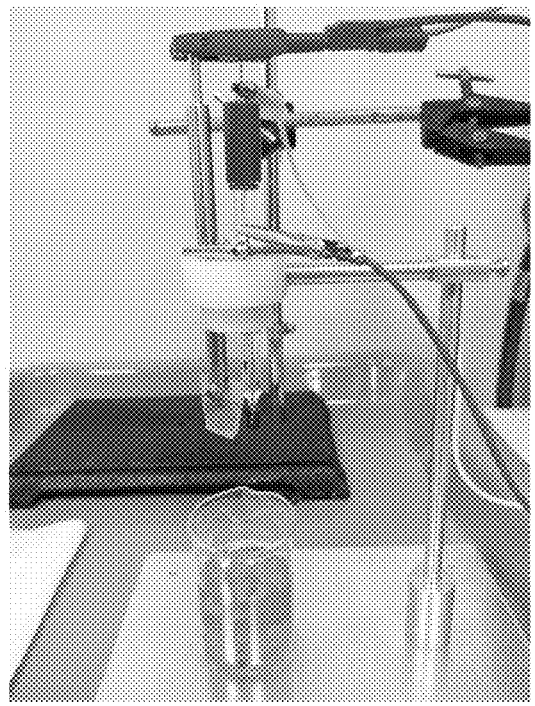
FIG. 1A is photograph of an exemplary setup for preparing the antimicrobial metal nanoparticle mesh.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the term "antimicrobial" refers to an agent that kills, deactivates, or stops, slows, or otherwise hinders the growth of microbes. Such an agent may be described as "antimicrobial" or may be referred to as "an antimicrobial". As used herein, "microbe" refers to a microorganism including, but not limited to archaea, bacteria, protozoa, and viruses. The term microbe may be used to specifically refer to harmful or infectious microorganisms. Antimicrobials may be divided into classes based on use cases. For example, the term "disinfectant" may be used for antimicrobial agents which are intended for use on non-living tissue, the term "antiseptic" may be used for antimicrobial agents which are intended for use on living tissue but not administered into an organism, and the term "antibiotic" may be used for antimicrobial agents which destroy microbes present in the body of another organism such as a human. The term "antifungal" may be used to refer to antimicrobial agents which act against fungi. The term "antiparasitic" may be used to refer to antimicrobial agents which act against parasites such as nematodes, cestodes, trematodes and infectious protozoa. The term "antiviral" may be used to refer to antimicrobial agents which act against viruses. The term "antibacterial" may be used to refer to antimicrobial agents which act against bacteria. Antimicrobial agents may act by chemical means, physical means, or both. The chemical means may be microbe-specific, that is, acting only on a particular type or subset of a type of microbe. Alternatively, the chemical means may be non-specific, that is, acting generally against multiple or all classes of microbes.

According to a first aspect, the present disclosure relates to an antimicrobial air treatment device, comprising an antimicrobial metal nanoparticle mesh. The antimicrobial metal nanoparticle mesh comprises a steel support mesh having a wire size of 15 to 40 µm, preferably 15.5 to 39.5 µm, preferably 16 to 39 µm, preferably 16.5 to 38.5 µm, preferably 17 to 38 µm, preferably 17.5 to 37.5 µm, preferably 18 to 37 µm, preferably 18.5 to 36.5 µm, preferably 19 to 36 µm, preferably 19.5 to 35.5 µm, preferably 20 to 35 µm, preferably 20.5 to 34.5 µm, preferably 21 to 34 µm, preferably 21.5 to 33.5 µm, preferably 22 to 33 µm, preferably 22.5 to 32.5 µm, preferably 23 to 32 µm, preferably 23.5 to 31.5 µm, preferably 24 to 31 µm, preferably 24.5 to 30.5 µm, preferably 25 to 30 µm, preferably 26.25 to 29.75 µm, preferably 26.5 to 29.5 µm, preferably 26.75 to 29.25 µm, preferably 27 to 29 µm, preferably 27.25 to 28.75 µm, preferably 27.5 to 28.5 µm, preferably 27.75 to 28.25 µm and copper nanoparticles. The wire size may refer to a thickness of the wire, but does not refer to a length of the wire. The wire may have a cross-section which is a circle, an ellipse, a square, a rectangle, a triangle, a pentagon, a hexagon, a trapezoid, or some other shape. In embodiments where the wire has a circular cross-section, the wire size may be the diameter of the circle. In embodiments where the wire has an elliptical cross-section, the wire size may refer to the major axis of the ellipse, the minor axis of the ellipse, or an average of the two. In embodiments where the wire has a square cross-section, the wire size may refer to a side length or a diagonal of the square. In embodiments where the wire has a rectangular cross-section, the wire size may refer to a length of a long side, a length of a short side, an average of the two, or a diagonal of the rectangle. In embodiments where the wire has a pentagonal cross section, the wire size may refer to a height (distance from one side to the opposite vertex) of the pentagon or a width (distance between two farthest separated points, which equals the diagonal length) of the pentagon. In embodiments where the wire has a hexagonal cross-section, the wire size may refer to a long diagonal (also referred to as the maximal diameter or circumradius) of the hexagon or a short diagonal (also referred to as a minimal diameter, a flat-to-flat distance, separation of parallel sides, or diameter of an inscribed circle) of the hexagon. The mesh may be a woven mesh or a welded mesh. A woven mesh refers to a mesh formed by interlacing individual wires in a regular manner, the wires passing over and under other wires in the mesh. A welded mesh refers to a mesh formed from short, individual wires or wire segments which are joined at intersections by welding. In a welded mesh, the wires to not pass over or under each other in contrast to a woven mesh. The mesh may have openings having any suitable shape known to one of ordinary skill in the art, e.g. square, rectangular, rhombic (also known as diamond), and hexagonal. A woven mesh may be woven in any suitable weaving pattern known to one of ordinary skill in the art. Examples of such weaving patterns include, but are not limited to, plain weave, twilled weave, crimped weave, flat top weave, and Dutch weave.

The copper nanoparticles are present in a nanoparticle layer having a layer thickness of 10 to 16 µm, preferably 10.1 to 15.9 µm, preferably 10.2 to 15.8 µm, preferably 10.3 to 15.7 µm, preferably 10.4 to 15.6 µm, preferably 10.5 to 15.5 µm, preferably 10.6 to 15.4 µm, preferably 10.7 to 15.3 µm, preferably 10.8 to 15.2 µm, preferably 10.9 to 15.1 µm, preferably 11 to 15 µm, preferably 11.1 to 14.9 µm, preferably 11.2 to 14.8 µm, preferably 11.3 to 14.7 µm, preferably 11.4 to 14.6 µm, preferably 11.5 to 14.5 µm, preferably 11.6 to 14.4 µm, preferably 11.7 to 14.3 µm, preferably 11.8 to 14.2 µm, preferably 11.9 to 14.1 µm, preferably 12 to 14 µm. The nanoparticle layer is disposed upon the steel support mesh, wherein the antimicrobial metal nanoparticle mesh has an opening size of 10 to 15 µm, preferably 10.1 to 14.9 µm, preferably 10.2 to 14.8 µm, preferably 10.3 to 14.7 µm, preferably 10.4 to 14.6 µm, preferably 10.5 to 14.5 µm, preferably 10.6 to 14.4 µm, preferably 10.7 to 14.3 µm, preferably 10.8 to 14.2 µm, preferably 10.9 to 14.1 µm, preferably 11 to 14 µm, preferably 11.1 to 13.9 µm, preferably 11.2 to 13.8 µm, preferably 11.3 to 13.7 µm. In embodiments where the mesh has square-shaped openings, the opening size may refer to a side length or a diagonal of the square. In embodiments where the mesh has rectangular-shaped openings, the opening size may refer to a length of a long side, a length of a short side, an average of the two, or a diagonal of the rectangle. In embodiments where the mesh has diamond-shaped openings, the opening size may refer to a long diagonal, a short diagonal, a height, or a side length of the diamond shape. In embodiments where the mesh has hexagonal-shaped openings, the opening size may refer to a long diagonal (also referred to as the maximal diameter or circumradius) of the hexagon or a short diagonal (also referred to as a minimal diameter, a flat-to-flat distance, separation of parallel sides, or diameter of an inscribed circle) of the hexagon. The steel support mesh may be any suitable steel known to one of ordinary skill in the art. In preferred embodiments, the steel is a stainless steel. The steel must by definition comprise iron, but may further comprise additional elements. Examples of suitable additional elements include, but are not limited to carbon, chromium, nickel, manganese, silicon, phosphorous, sulfur, nitrogen, vanadium, boron, molybdenum, and tungsten. Steel may be referred to by a steel grade. One suitable steel grade system is the SAE steel grades. Examples of suitable SAE steel grades include, but are not limited to 201, 202, 304, 316, 316L. It should be understood that as used herein, "copper" is understood to also include alloys which have copper as a principle component (i.e. comprise greater than 50 wt % copper). In some embodiments, the copper nanoparticles comprise at least 60 wt % preferably at least 65 wt %, preferably at least 70 wt %, preferably at least 75 wt %, preferably at least 80 wt %, preferably at least 85 wt %, preferably at least 90 wt %, preferably at least 92.5 wt %, preferably at least 95 wt %, preferably at least 97.5 wt %, preferably at least 98 wt %, preferably at least 98.5 wt %, preferably at least 99 wt %, preferably at least 99.25 wt %, preferably at least 99.5 wt %, preferably at least 99.75, preferably at least 99.9 wt % copper. In some embodiments, the copper nanoparticles are 99.99+ wt % pure copper. Examples of such alloys include, but are not limited to gilding metal; Muntz metal; beryllium copper; nickel silver; cupronickel; Dunce metal; bronzes such as manganese bronze, tin bronze, leaded tin bronze, aluminum bronze, silicon bronze, phosphor bronze, commercial bronze, architectural bronze, mild bronze, bell metal, arsenical bronze, speculum metal, and cymbal alloy; and brasses such as Abyssinian gold, admiralty brass, Aich's alloy, aluminum brass, arsenical brass, cartridge brass, common brass, DZR brass, delta metal, free machining brass, high brass, leaded brass, low brass, manganese brass, naval brass, nickel brass, Nordic gold, drichalcum, Prince's metal, red brass (also known as gunmetal), tombac, silicon tombac, tonval brass, and yellow brass.

In general, the copper nanoparticles can be any shape known to one of ordinary skill in the art. Examples of suitable shapes the copper nanoparticles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, rods (also known as nanorods), blocks, flakes, discs, granules, angular chunks, and mixtures thereof. In the case of nanorods, the rod shape may be defined by a ratio of a rod length to a rod width, the ratio being known as the aspect ratio. For particles of ferroelectric oxide of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the copper nanoparticles are envisioned as having in any embodiments.

In some embodiments, the copper nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of copper nanoparticles having a different shape. As used herein, the term "non-uniform shape" refers to an average consistent shape that differs by more than 10% of the distribution of copper nanoparticles having a different shape. In one embodiment, the shape is uniform and at least 90% of the copper nanoparticles are spherical or substantially circular, and less than 10% are polygonal. In another embodiment, the shape is non-uniform and less than 90% of the copper nanoparticles are spherical or substantially circular, and greater than 10% are polygonal.

The copper nanoparticles have a mean particle size of 250 to 1000 nm, preferably 275 to 975 nm, preferably 300 to 950 nm, preferably 325 to 925 nm, preferably 350 to 900 nm, preferably 375 to 875 nm, preferably 400 to 850 nm, preferably 425 to 825 nm, preferably 450 to 800 nm. In embodiments where the copper nanoparticles are spherical, the particle size may refer to a particle diameter. In embodiments where the copper nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the copper nanoparticles have an anisotropic shape such as nanorods, the particle size may refer to a length of the nanorod, a width of the nanorod, or an average of the length and width of the nanorod. In some embodiments, the particle size refers to the diameter of a sphere having an equivalent volume as the particle.

In some embodiments, the copper nanoparticles are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the copper nanoparticles of the present disclosure are monodisperse having a particle size distribution ranging from 80% of the average particle size to 120% of the average particle size, preferably 90-110%, preferably 95-105% of the average particle size. In some embodiments, the copper nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

The antimicrobial air treatment device also comprises one or more filtration layers, each comprising a filtration medium. In some embodiments, the filtration medium is at least one selected from the group consisting of a woven fabric, a nonwoven fabric, a fiberglass, and a paper. The filter layer may be made up of a plurality of fibers. The fibers may be formed from any suitable material known to one of ordinary skill in the art. Examples of such suitable materials include, but are not limited to cotton, wool, silk, linen, jute, alpaca fiber, olefin fiber, camel hair, hemp, horsehair, ixtle, flax, polymers, and mixtures thereof. Examples of applicable polymers may include polyolefin, polyacetal, polyamide, polyester, cellulose ether and ester, polyalkylene sulfide, polyarylene oxide, polysulfone, modified polysulfone polymers, nylon, polystyrene, polyacrylonitrile, polycarbonate, polyvinyl alcohol, polyvinylpyrrolidone, poly(lactic acid), poly(lactic-co-glycolic acid), polybutylene terephthalate, polyurethane, and mixtures thereof. Polymer fibers may be formed by any suitable technique, such as electrospinning, phase separation, melt-blowing, self-assembly, templated synthesis, drawing, interfacial polymerization, or a combination of these.

A woven fabric may be formed from the fibers using any suitable weave, such as plain weave, twill weave, satin weave, or combinations thereof. The woven fabric may be formed from threads, yarns, or other material formed from interlocked fibers which are woven to form the woven fabric. It should be understood here that for the purposes of the present disclosure "woven fabric" includes fabric which is formed by knitting. While in a woven fabric, there are separate warp and weft threads, knitting has only a single such type of thread which is looped, tied, crossed, bent, entangled, or otherwise interlocked with other threads. For the purposes of the present disclosure, the term "woven fabric" refers to knit fabrics, woven fabrics, and other fabrics in which the fibers, threads, or yarns are interlocked or otherwise connected in such an ordered fashion. This is in contrast to a non-woven fabric in which the fibers, threads, or yarns are interlocked in a non-ordered fashion. A non-woven fabric comprises fibers, threads, or yarns which may be interlocked, entangled, or bonded mechanically, thermally, or chemically. The non-woven fabric may comprise an adhesive or a binder. The non-woven fabric may be formed using any suitable technique known to one of ordinary skill in the art. For example the non-woven fabric may be a staple non-woven, melt-blown, spunlaid, flashspun, needle-punched, felted, or formed by any other suitable technique. The filtration medium may be characterized by a fiber size. Such fibers may include microfibers or nanofibers. The fibers may be porous or non-porous. The filtration medium may be characterized by a pore size, a particulate size approaching 100% retention, or any other suitable metric known to one of ordinary skill in the art. The pore size may refer to pores which are formed in porous fibers, pores which are formed from spaces in between or bounded by separate fibers, or a combination of these.

In some embodiments, the filtration layer(s) comprise adsorption particles. Examples of adsorption particles include activated carbon, silica gel, activated alumina, zeolites, porous clay minerals, molecular sieves, or combinations thereof.

The filtration layer(s) may be formed from a single piece or layer of the filtration medium. Alternatively, the filtration layer(s) may be formed from multiple pieces or layer of the filtration medium. In some embodiments, the filtration layer(s) are pleated. Such pleats may fully overlap each other such that the pleats may be considered folds or multiple layers. Alternatively, the pleats may not fully overlap such that there are portions of the filtration layer(s) that comprise only a single layer and portions which comprise more than one layer. Such pleats may allow for expansion or contraction of the filtration layer(s). Such pleats or folds present in one filtration layer may nest into pleats or folds present in another filtration layer. This expansion or contraction may be advantageous for conforming to a wearer's face, flexing during wearer movement such as talking or breathing, or permit the filtration layer(s) to be transformed from a compact state to an expanded state.

In some embodiments, the antimicrobial air treatment device further comprises a filter support layer. In some embodiments, the filter support layer is at least one selected from the group consisting of a polymer mesh and a metal mesh. It should be understood that a metal mesh used as the filter support layer is distinct from the steel support mesh of the antibacterial metal nanoparticle mesh. The filter support layer may be a wire mesh, an expanded mesh, or a perforated mesh. The wire mesh may be as described above. In embodiments where the filter support layer is a wire mesh, the filter support layer may have a wire size which is similar to the wire size of the antimicrobial metal nanoparticle mesh. Alternatively, the filter support layer may have a wire size which is larger than the wire size of the antimicrobial metal nanoparticle mesh, for example up to 50 mm, preferably up to 40 mm, preferably up to 30 mm, preferably up to 20 mm, preferably up to 10 mm, preferably up to 9 mm, preferably up to 8 mm, preferably up to 7 mm, preferably up to 6 mm, preferably up to 5 mm, preferably up to 4 mm, preferably up to 3 mm, preferably up to 2 mm, preferably up to 1 mm. The filter support layer may have an opening size which is similar to the opening size of the antimicrobial metal nanoparticle mesh. Alternatively, the filter support layer may have an opening size which is larger than the opening size of the antimicrobial metal nanoparticle mesh, for example up to 100 mm, preferably up to 90 mm, preferably up to 80 mm, preferably up to 70 mm, preferably up to 60 mm, preferably up to 50 mm, preferably up to 40 mm, preferably up to 30 mm, preferably up to 25 mm, preferably up to 20 mm, preferably up to 15 mm, preferably up to 10 mm. The filter support layer may be intended to provide structural stability to the filtration layer(s) and optionally to any other layer, or to the antimicrobial air treatment device itself. In some embodiments, the filter support layer increases a rigidity or stiffness of the antimicrobial air treatment device. In some embodiments, the filter support layer provides resistance to puncture, tearing, or other loss of integrity. In embodiments where the filter support layer is a mesh, the filter support layer may have any suitable mesh size which is substantially larger than the pore size or particulate size approaching 100% retention of the filtration medium. Preferably the filter support layer has a mesh size which is at least 100% larger, preferably at least 200% larger, preferably at least 300% larger, preferably at least 400% larger, preferably at least 500% larger than the pore size of the filtration medium. This may be advantageous for having airflow or filtration properties of the antimicrobial air treatment device which are substantially dictated by the filtration medium. For example, the filter support layer may increase an airflow resistance of the antimicrobial air treatment device by less than 5%, preferably less than 4%, preferably less than 3%, preferably less than 2%, preferably less than 1% of a similar antimicrobial air treatment device which lacks said filter support layer.

In some embodiments, the antimicrobial air treatment device is a facemask comprising a main body comprising the an antimicrobial metal nanoparticle mesh and one or more filtration layers, wherein the main body is configured to fit over a portion of a person's face such that air which is inhaled or exhaled by the person passes through the facemask. A facemask of the present disclosure includes those that cover a health care personnel's, patient's, or a person's (hereinafter "wearer" or "wearer's") nose or mouth, and optionally, a further portion of the wearer's face, i.e., cheeks, jaw, chin, and so forth. The term "mask" or "facemask" is sometimes used in other contexts to refer only to such face coverings which do not make a seal to the face of a wearer, while the term "respirator" is used to refer to such face coverings which seal tight to the face of a wearer. It should be understood that the term "facemask" as used herein also refers to respirators. That is, the facemask of the present disclosure may or may not form a seal to the face of a wearer. The facemask may be foldable or non-foldable. Facemasks contemplated within the scope of the present invention include both disposable and non-disposable facemasks, and include facemasks and filter materials thereof that can be reused and washed and still retain antimicrobial activity and/or filtration capability. The facemask may be butterfly-shaped, cup-shaped, half-moon shaped, hatched-shaped, duckbill-shaped, scalloped-shaped, or any other suitable shape known to one of ordinary skill in the art. The facemask may have an upper edge which is intended to be oriented above the nose of a wearer. The upper edge may be straight, curved, scalloped, pointed, or have some other shape. The facemask may have a lower edge which is intended to be oriented at or below the chin or jaw of a wearer. The lower edge may have a substantially similar shape as the upper edge or may have a different shape from the upper edge. In some embodiments, the upper edge may be similar to the lower edge such that there is no difference between the edges and the facemask may be worn with either edge acting as the upper edge.

Examples of other components which may be present as part of the facemask in some embodiments include, but are not limited to the filter support layer as described above, two or more attachment straps, a cushion, an inner comfort layer, an outer protective layer, or combinations thereof. In some embodiments, a cushion is attached to an inner part of the main body. The cushion may serve as a softening, pressure-relieving, or impact-absorbing component. Such a component may increase wearer comfort, particularly if wearing the facemask for an extended period of time. The cushion may serve to form or improve a seal when a wearer is wearing the facemask. The cushion may be in the form of a strip of a foam or sponge-like material, an enclosed pouch or pillow filled with a cushioning fill, or other such suitable form. The cushion may be formed from or contain a polymer foam, a natural sponge, a natural or synthetic down, a fiberfill, hair or fur, or a combination of these. Preferably the cushion is placed or oriented such that the cushion is in contact with the wearer. In some embodiments, the facemask comprises a stiffening member attached to, disposed upon, or integrated into an upper edge of the main body. The stiffening member may be a metal strip or a plastic strip may and may allow or facilitate the facemask to conform the face when wearing the facemask. The stiffening member may act to lessen the amount of or prevent air leakage during inhalation or exhalation. This air leakage refers to air which passes either into or out of the wearer's nose and/or mouth beyond the extent of the facemask without passing through the antimicrobial nanoparticle mesh.

The attachment straps can be attached to the left hand side of the main body and the right hand side of the main body respectively such that the facemask can be fixed onto the face. The attachment straps may be elastic straps intended to secure the facemask to the wearer with support from the wearer's ears. The elastic straps can also be attached to the upper side of the main body and the lower side of the main body respectively such that the facemask can be fixed onto the face with the support from the wearer's head. Such elastic straps or loops may have both ends secured to the main body to create loops which fit around the wearer's head, ears, or both. The attachment straps may be non-elastic straps. Such non-elastic straps may have only a single end secured to the main body. The non-secured end may be available to tie to, loop around, interface with, or be attached to another portion of the facemask, a piece of clothing, jewelry, body part, or another attachment strap. For example, a pair of attachment straps may be tied, hooked, fastened, clasped, buttoned, or otherwise connected to each other secure around the wearer's head. Alternatively, a single attachment strap may be similarly connected to an attachment structure on the facemask, such as a button hole, a button, a hook, or the like.

In some embodiments, the outer protective layer is formed from a suitable textile or fabric material. Examples of such suitable textile or fabric materials include, but are not limited to cotton, canvas, wool, silk, linen, jute, modal, alpaca, olefin fiber, camel hair, hemp, horsehair, ixtle, flax, bamboo, alginate, rayon, polymers, and mixtures thereof. Examples of applicable polymers may include polyolefin, polyacetal, polyamide, polyester, cellulose ether and ester, polyalkylene sulfide, polyarylene oxide, polysulfone, modified polysulfone polymers, nylon, polystyrene, polyacrylonitrile, polycarbonate, polyvinyl alcohol, polyvinylpyrrolidone, poly(lactic acid), poly(lactic-co-glycolic acid), polybutylene terephthalate, polyurethane, and mixtures thereof. Examples of fabrics made from polymers include, but are not limited to aramid (e.g. Twaron™, Kevlar™, and Nomex™), acrylic, nylon, spandex, ingeo, lurex, and carbon fiber. In some embodiments, the outer protective layer is puncture- or tear-resistant. In some embodiments, the outer protective layer is water-resistant or waterproof. In such embodiments, the outer protective layer should still allow air and other gases or vapors to pass through. The outer protective layer may serve to provide protection to the antimicrobial metal nanoparticle mesh from punctures, tears, scratches, contamination with foreign substances, or combinations thereof.

In some embodiments, the inner comfort layer is formed from a suitable textile or fabric material as described above. In some embodiments, the comfort layer has a soft, smooth, or non-irritating texture. The inner comfort layer may be indented to contact a wearer's skin, particularly facial skin. The inner comfort layer may provide a wearer protection from contact with edges, points, protrusions, bumps, pressure points, or other similar sharp and/or unpleasant textures.

In some embodiments, the antimicrobial air treatment device further comprises an antimicrobial mesh housing pouch in which the antimicrobial metal nanoparticle mesh is removably contained. The antimicrobial mesh housing pouch contains the antimicrobial metal nanoparticle mesh and may be useful for maintaining the position or orientation of the antimicrobial metal nanoparticle mesh within the facemask. The antimicrobial metal nanoparticle mesh may be removed from the antimicrobial mesh housing pouch. Such removal may be advantageous for replacing the antimicrobial metal nanoparticle mesh, replacing the other portions of the facemask, cleaning the antimicrobial metal nanoparticle mesh, cleaning the other portions of the facemask, repairing the antimicrobial metal nanoparticle mesh, repairing the other portions of the facemask, or the like. The antimicrobial mesh housing pouch may close. Such closure may be achieved through one or more buttons, hooks, clasps, snaps, ties, or combination thereof. The closure may involve a flap or fold of material which serves to cover an opening of the antimicrobial mesh housing pouch. Alternatively, the opening of the antimicrobial mesh housing pouch may not be covered by a flap or fold. Alternatively, the antimicrobial mesh housing pouch may not close. The antimicrobial mesh housing pouch may be any suitable size and shape so as to permit the antimicrobial metal nanoparticle mesh to be placed into and removed from the antimicrobial mesh housing pouch. Preferably, the opening of the antimicrobial mesh housing pouch is of a size so as to allow the metal nanoparticle mesh to be placed into and removed from the antimicrobial metal nanoparticle mesh without bending, folding, or other deformation of the antimicrobial metal nanoparticle mesh.

In some embodiments, the antimicrobial air treatment device further comprises an outer protective layer, an inner comfort layer, and a first filtration layer comprising a filtration medium selected from the group consisting of a woven fabric, a nonwoven fabric, a fiberglass, and a paper, as described above.

In some embodiments, the antimicrobial air treatment device further comprises a second filtration layer comprising a filtration medium selected from the group consisting of a woven fabric, a nonwoven fabric, a fiberglass, and a paper, as described above. The second filtration layer may be similar to or distinct from the first filtration layer.

In order to claim a product as a surgical/medical mask, the product must pass a series of tests according to the standard such as ASTM F2100 or EN14683, each of which is incorporated herein by reference in its entirety. For ASTM F2100, the performance of a surgical/medical mask is based on testing for (1) bacterial filtration efficiency (BFE), (2) differential pressure, (3) sub-micron particulate filtration efficiency (PFE), (4) resistance to penetration tested by synthetic blood, and (5) resistance to flammability.

The table below summarizes the surgical/medical mask requirements by performance level according to ASTM F2100.

TABLE 1

Standards for surgical masks according to ASTM F2100.

| Test | Level 1 Barrier | Level 2 Barrier | Level 3 Barrier |
|---|---|---|---|
| BFE at 28.3 L/min (challenge used: *Staphylococcus aureus*, with a mean size at around 3 μm) | ≥95% | ≥98% | ≥98% |
| Differential pressure at 8 L/min | <4.0 mm H$_2$O/cm$^2$ | <5.0 mm H$_2$O/cm$^2$ | <5.0 mm H$_2$O/cm$^2$ |
| Sub-micron PFE at 28.3 L/min (challenge used: 0.1 μm Latex spheres) | ≥95% | ≥98% | ≥98% |
| Resistance to penetration by synthetic blood, minimum pressure for pass result | 80 mm Hg | 120 mm Hg | 160 mm Hg |
| Flame Spread | Class 1 | Class 1 | Class 1 |

For typical surgical/medical masks, and in referencing to the BFE test and the sub-micron PFE test, the filtration efficiency percentage must not be lower than 95%. The average size of the aerosol particles in the BFE test is around 3 μm while the average size of the aerosol particles in the sub-micron PFE test is around 0.1 The aerosol particles are trapped by protective masks comprising nonwoven meshes of fibers through a combination of mechanisms including inertial impaction capture, interception capture, and Brownian diffusion capture. Inertial impaction/interception predominates in the BFE test because of the relatively large particle size while Brownian diffusion predominates in the sub-micron PFE test because of the relatively small particle size. The most penetrating particle size (MPPS) is 0.3 As both diffusion and impaction/interception are inefficient for particles near the MPPS, passing the aforementioned tests (i.e. BFE test and sub-micron PFE test) does not justify the high level of protection of the surgical/medical mask.

Moreover, surgical/medical masks are not designed to seal tightly to the face. Without an adequate seal to the face, inhaled breath is not forced through the filter and instead flows through the gaps around the seal area, providing minimal protection by allowing potentially hazardous contaminants to enter the workers' breathing zone through gaps between the wearer's face and the mask. Therefore, surgical/medical masks do not provide the degree of protection to be considered respiratory personal protective equipment (PPE).

Respirator filters are rated as N, R or P for their level of protection against oil aerosols. This rating is critical in industry because some industrial oils can remove electrostatic charges from the filter media, thereby reducing the filtration efficiency. Respirators are rated "N" if they are not resistant to oil, "R" if they are somewhat resistant to oil, and "P" if they are strongly resistant to oil. Respirator filters that capture at least 95% of the challenge aerosol are given a 95 rating. Those that trap at least 99% receive a 99 rating. And those that collect at least 99.97% receive a 100 rating. N95 respirator is the most popular PPE among the aforementioned respirators. In order to claim a product as an N95 respirator, the product must pass the required National Institute for Occupational Safety and Health (NIOSH) test, which is more stringent than the tests used for surgical/medical masks in terms of protection. The table below summarizes the N95 respirator requirements by performance level according to NIOSH.

TABLE 2

Standards for N95 respirators.

| Test | Requirement |
|---|---|
| Filtration efficiency at 85 L/min (challenge used: 0.3 μm NaCl particles) | ≥95% |
| Inhalation resistance at 85 L/min | ≤35 mm H$_2$O |
| Exhalation resistance at 85 L/min | ≤25 mm H$_2$O |

According to NIOSH, neutralized sodium chloride (NaCl) aerosol comprising particles at the MPPS is used as the challenge. Neutralized aerosol is used to prevent attraction of particles to the sample by electrostatic force. The flow rate of the NaCl aerosol is 85 L/min, which is higher than the flow rate employed in the BFE test (i.e. 28.3 L/min). Such flow rate is also higher than the air requirement for a human under most circumstances such as sitting, walking, and even jogging. The filtration efficiency must not be lower than 95% in order to maintain an N95 rating.

In some embodiments, the facemask meets the requirements to be classified as a surgical mask according to ASTM F2100. In such embodiments, the facemask may be a level 1, level 2, or level 3 barrier. In some embodiments, the facemask meets the requirements to be classified as a N95 respirator as described above.

In some embodiments, the antimicrobial air treatment device is configured to be a part or entirety of a filter cartridge intended for use with a cartridge-accepting respirator. For examples of such filter cartridges or cartridge-accepting respirators, see US20080156329A1, U.S. Pat. No. 5,647,356A, EP0094757B1, and US20180339178A1.

In some embodiments, antimicrobial air treatment device is configured to be a component of a moving air filtration system which is at least one selected from the group consisting of an HVAC system, an automobile cabin air filtration system, and an air purifier.

In some embodiments, the antimicrobial air treatment device further comprises a first filtration layer comprising a filtration medium. In some embodiments, the filtration medium is at least one selected from the group consisting of a woven fabric, a nonwoven fabric, a fiberglass, and a paper, as described above. In some embodiments, the antimicrobial air treatment device further comprises a filter support layer, as described above. In some embodiments, the antimicrobial air treatment device further comprises a second filtration layer comprising a filtration medium as described above.

The antimicrobial air treatment device may be configured to have air pass through the antimicrobial air treatment device in only a single direction. In some such embodiments, the device may be configured such that air passes through the first filtration layer before passing through the antimicrobial metal nanoparticle mesh. Alternatively, the device may be configured such that the air passes through the antimicrobial metal nanoparticle mesh before passing through the first filtration layer. In some embodiments, the antimicrobial air treatment device may be configured to have air pass through the antimicrobial air treatment device in more than one direction. In some such embodiments, there may be two opposing directions in which air may flow through the device. In some such embodiments, the antimicrobial metal nanoparticle mesh may be located, placed, or disposed in the device in between the first filtration layer and the second filtration layer. In such an embodiment, in one airflow direction, the air passes through the first filtration layer, the antimicrobial metal nanoparticle mesh, then through the second filtration layer. In the opposing airflow direction, the air passes through the second filtration layer, the antimicrobial metal nanoparticle mesh, then through the first filtration layer.

In general, the antimicrobial air treatment device may be placed at or integrated into any suitable location in an HVAC system. For example, the antimicrobial air treatment device may be located within an air duct, adjacent to a blower, adjacent to a furnace or other heating device, adjacent to an air conditioner or other cooling device, at a vent, or any combination of these. The vent may be a return vent or a supply vent. In embodiments where the antimicrobial air treatment device is a component of an automobile cabin air filtration system, the device may treat air entering the automotive cabin, air exiting the automotive cabin, air being circulated within the automotive cabin, or a combination of these.

In some embodiments, the antimicrobial air treatment device has a flat shape having a perimeter in the shape of a circle, square, rectangle, trapezoid, or other polygon. In other embodiments, the antimicrobial air treatment device has a substantially cylindrical or elliptic cylindrical shape. The cylindrical or elliptic cylindrical shape may be right or oblique. The cylindrical or elliptic cylindrical shape may be truncated. The cylindrical or elliptic cylindrical shape may be hollow such that air flows from an exterior to an interior of the hollow cylinder or elliptic cylinder or vice-versa. The antimicrobial air treatment device may have a border. The border may be formed from metal, cardboard, a plastic, or other suitable material. The border may serve to protect one or more edges of the antimicrobial air treatment device, provide structural stability to the antimicrobial air treatment device, or to permit or facilitate integration of the antimicrobial air treatment device into the moving air filtration system. The antimicrobial air treatment device may have a gasket disposed on one or more edges or surfaces of the antimicrobial air treatment device, for example the border. The gasket may be useful for providing or helping create a seal around the antimicrobial air treatment device which directs an entirety of an air flow through the moving air filtration system through the antimicrobial air treatment device. The gasket may serve to block air leakage around the antimicrobial air treatment device. The antimicrobial air treatment device or the antimicrobial metal nanoparticle mesh and/or the first filtration layer may have pleats, folds, zig-zags, ridges, peaks, valleys, or other structural features which increase an available air treatment surface area contain within a given extent.

Filters meeting the HEPA standard must satisfy certain levels of efficiency. Common standards require that a HEPA air filter must remove from the air that passes through at least 99.95% by European Standard [European Standard EN 1822-1:2009, "High efficiency air filters (EPA, HEPA and ULPA)", 2009, incorporated herein by reference in its entirety] or 99.97% ISO standard 29463 ["INTERNATIONAL ISO STANDARD 29463-1—High-efficiency filters and filter media for removing particles in air". International Organization for Standardization. Oct. 15, 2011, incorporated herein by reference in its entirety] of particles whose diameter is equal to 0.3 µm, with the filtration efficiency increasing for particle diameters both less than and greater than 0.3 µm. The table below summarizes the required efficiency for retaining particles whose diameter is equal to 0.3 µm to meet various HEPA or ULPA classifications.

TABLE 3

Particle retention percentages specified by European and ISO standards for filter classification

| Efficiency | EN 1822 | ISO 29463 | Retention (averaged) | Retention (spot) |
|---|---|---|---|---|
| EPA | E10 | — | ≥85% | — |
|  | E11 | ISO 15 E | ≥95% | — |
|  |  | ISO 20 E | ≥99% | — |
|  | E12 | ISO 25 E | ≥99.5% |  |
|  |  | ISO 30 E | ≥99.9% |  |
| HEPA | H13 | ISO 35 H | ≥99.95% | ≥99.75% |
|  |  | ISO 40 H | ≥99.99% | ≥99.95% |
|  | H14 | ISO 45 H | ≥99.995% | ≥99.975% |
|  |  | ISO 50 H | ≥99.999% | ≥99.995% |
| ULPA | U15 | ISO 55 U | ≥99.9995% | ≥99.9975% |
|  |  | ISO 60 U | ≥99.9999% | ≥99.9995% |
|  | U16 | ISO 65 U | ≥99.99995% | ≥99.99975% |
|  |  | ISO 70 U | ≥99.99999% | ≥99.9999% |

In some embodiments, the antimicrobial air treatment device meets requirements to be classified as a HEPA filter by EN1822. In such embodiments, the antimicrobial air treatment device may meet either the H13 or H14 classification. In some embodiments, the antimicrobial air treatment device meets requirements to be classified as a HEPA filter by ISO 29463. In such embodiments, the antimicrobial air treatment device may meet the requirements ISO 35 H, ISO 40 H, ISO 45 H, or ISO 50 H classification. In some embodiments, the antimicrobial air treatment device meets requirements to be classified as a ULPA filter by EN1822. In such embodiments, the antimicrobial air treatment device may meet either the U15 or U16 classification. In some embodiments, the antimicrobial air treatment device meets requirements to be classified as a ULPA filter by ISO 29463. In such embodiments, the antimicrobial air treatment device may meet the requirements ISO 55 U, ISO 60 U, ISO 65 U, or ISO 70 U classification.

The present disclosure also relates to a method of forming the antimicrobial air treatment device. The method comprises immersing the steel support mesh in a deposition solution and electrodepositing the copper nanoparticles to form the antimicrobial metal nanoparticle mesh.

The steel support mesh may be a steel support mesh having a wire size of 15 to 40 µm, preferably 15.5 to 39.5 µm, preferably 16 to 39 µm, preferably 16.5 to 38.5 µm, preferably 17 to 38 µm, preferably 17.5 to 37.5 µm, preferably 18 to 37 µm, preferably 18.5 to 36.5 µm, preferably 19 to 36 µm, preferably 19.5 to 35.5 µm, preferably 20 to 35 µm, preferably 20.5 to 34.5 µm, preferably 21 to 34 µm, preferably 21.5 to 33.5 µm, preferably 22 to 33 µm, preferably 22.5 to 32.5 µm, preferably 23 to 32 µm, preferably 23.5 to 31.5 µm, preferably 24 to 31 µm, preferably 24.5 to 30.5 µm, preferably 25 to 30 µm, preferably 26.25 to 29.75 µm, preferably 26.5 to 29.5 µm, preferably 26.75 to 29.25 µm, preferably 27 to 29 µm, preferably 27.25 to 28.75 µm, preferably 27.5 to 28.5 µm, preferably 27.75 to 28.25 µm. The steel support mesh may be as described above. The copper nanoparticles may be as described above.

The electrodepositing is performed by applying a voltage to the steel support mesh of −0.25 to −0.05 V, preferably −0.225 to −0.075 V, preferably −0.20 to −0.08 V, preferably −0.185 to −0.09 V, preferably −0.175 to −0.10 V, preferably −0.165 to −0.105 V, preferably −0.160 to −0.110 V, preferably −0.159 to −0.113 V vs Ag/AgCl. wherein the deposition solution comprises a copper (II) salt and water and has a pH less than 5, preferably less than 4.75, preferably less than 4.5, preferably less than 4.25, preferably less than 4.0, preferably less than 3.75, preferably less than 3.5, preferably less than 3.25, preferably less than 3.0, preferably less than 2.75, preferably less than 2.5, preferably less than 2.25, preferably less than 2.0, preferably less than 1.75, preferably less than 1.5. In some embodiments, the deposition solution has a pH of 0.5 to 1.5, preferably 0.55 to 1.45, preferably 0.60 to 1.40, preferably 0.65 to 1.35, preferably 0.70 to 1.30, preferably 0.75 to 1.25, preferably 0.80 to 1.20, preferably 0.85 to 1.15, preferably 0.90 to 1.10, preferably 0.95 to 1.05, preferably about 1.

In general the copper (II) salt may be any suitable copper (II) salt having a solubility in water at least 10 g/100 mL, preferably at least 12.5 g/100 mL, preferably at least 15 g/100 mL, preferably at least 17.5 g/100 mL, preferably at least 20 g/100 mL, preferably at least 22.5 g/100 mL, preferably at least 25 g/100 mL at about room temperature. Examples of suitable copper (II) salts include, but are not limited to copper (II) bromide, copper (II) chloride, copper (II) formate, copper (II) nitrate, copper (II) perchlorate, and copper (II) sulfate. In preferred embodiments, the copper (II) salt is copper sulfate.

In some embodiments, the copper sulfate is present in the deposition solution at an initial concentration of 0.25 to 0.75 M, preferably 0.275 to 0.725 M, preferably 0.30 to 0.70 M, preferably 0.325 to 0.675 M, preferably 0.35 to 0.65 M, preferably 0.375 to 0.625 M, preferably 0.40 to 0.60 M, preferably 0.41 to 0.59 M, preferably 0.42 to 0.58 M, preferably 0.43 to 0.57 M, preferably 0.44 to 0.56 M, preferably 0.45 to 0.55 M, preferably 0.46 to 0.54 M, preferably 0.47 to 0.53 M, preferably 0.48 to 0.52 M, preferably 0.49 to 0.51 M, preferably about 0.50 M.

In some embodiments, the electrodepositing is performed for 15 to 120 minutes, preferably 20 to 110 minutes, preferably 25 to 100 minutes, preferably 30 to 90 minutes, preferably 35 to 85 minutes, preferably 40 to 80 minutes, preferably 45 to 75 minutes, preferably 50 to 70 minutes, preferably 52.5 to 67.5 minutes, preferably 55 to 65 minutes, preferably 56 to 64 minutes, preferably 57 to 63 minutes, preferably 58 to 62 minutes, preferably 59 to 61 minutes, preferably about 60 minutes.

In some embodiments, the electrodepositing is performed with a current of −40 to −80 mA, preferably −42.5 to −77.5 mA, preferably −45 to −75 mA, preferably −47.5 to −72.5 mA, preferably −50 to −70 mA, preferably −52.5 to −67.5 mA, preferably −55 to −65 mA, preferably −57.5 to −62.5 mA after 30 to 60 sec, preferably after 35 to 55 sec, preferably after 40 to 50 sec.

The examples below are intended to further illustrate protocols for preparing and characterizing the structure and/or performance of the antimicrobial air treatment device, the antimicrobial metal nanoparticle mesh, or both and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

Examples

Materials

Copper sulfate (99%) was obtained from sigma Aldrich. Sulfuric acid (98%). Steel mesh with mesh size 480 μm, Ag/AgCl reference, and platinum wire counter electrode were purchased from Redox Company. A typical stand for electrochemical experiments was designed and developed in Manufacturing Lab of Mechanical Engineering Department of KAU.

Electrochemical Measurements and Deposition

Figure 1B:
FIG. 1B is a photograph of a steel slide following copper metal nanoparticle deposition using the setup depicted in FIG. 1A.

A standard three electrodes cell system was used for cyclic voltammetry and chronoamperometry using Biologic SP-200 electrochemical workstation (Seyssinet-Pariset, France). High quality steel mesh or steel slide acted as working electrode, platinum wire as counter electrode, and Ag/AgCl as reference electrode. Aqueous copper sulfate solutions of various concentrations (0.01, 0.05, 0.005, 0.1, and 0.5 M) were used as deposition solution for depositing copper metal nanoparticles. An example of the three electrode cell system is shown in FIG. 1A. An example of the slide following copper metal nanoparticle deposition is shown in FIG. 1B.

The electrochemical deposition of copper nanoparticle on steel slide or steel mesh were carried using different copper sulfate aqueous solution in order to optimize the deposition parameters by varying time, concentration, and deposition potential. First of all electrochemical deposition were carried out using 10 mL 0.01M $CuSO_4$ solution. The pH of the solution was adjusted at 1 with the help of diluted $H_2SO_4$. The deposition potential vs Ag/AgCl was determined by running the cyclic voltammogram which was then used in chronoamperometric deposition.

Figure 2A:
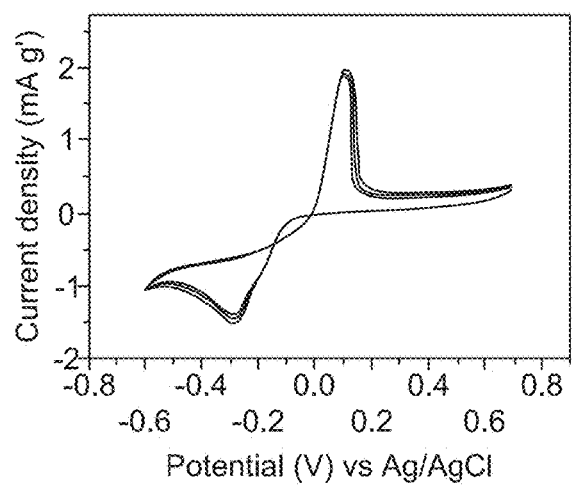
FIGS. 2A-2C are cyclic voltammetry (CV) plots (voltammograms) for the deposition of copper metal nanoparticles on stainless steel slide electrodes for deposition optimization.
Figure 2B:
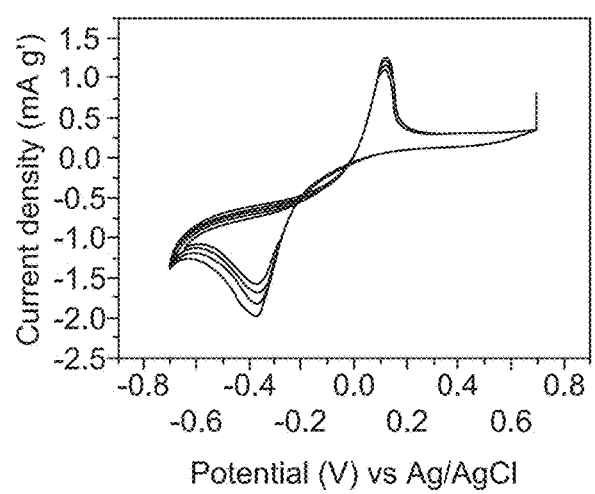
Figure 2C:
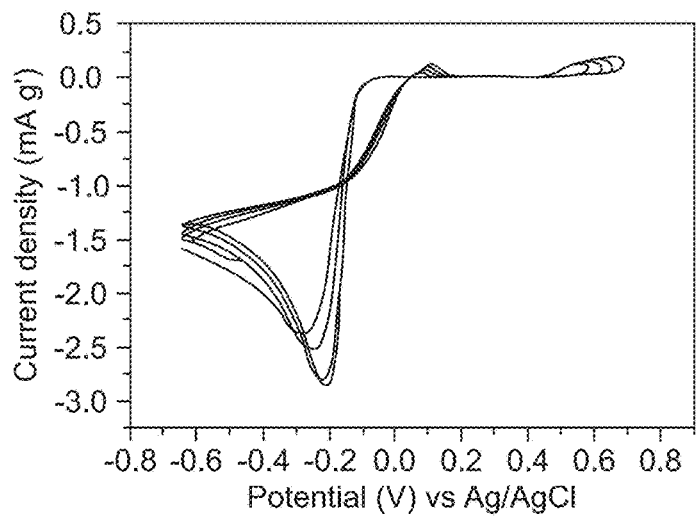
Figure 3A:
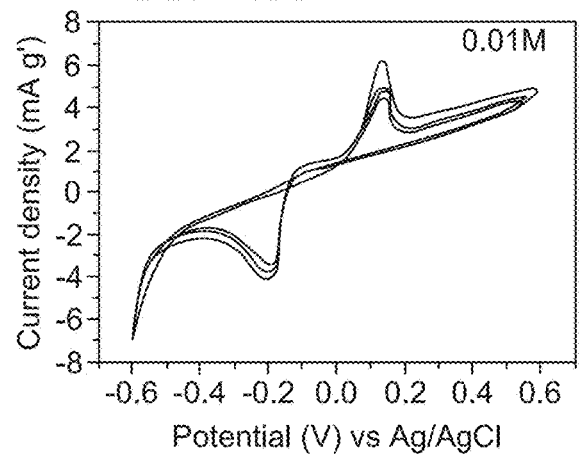
FIGS. 3A-3D are cyclic voltammetry plots (voltammograms) for the deposition of copper metal nanoparticles on stainless steel mesh substrates at different copper sulfate concentrations where
Figure 3B:
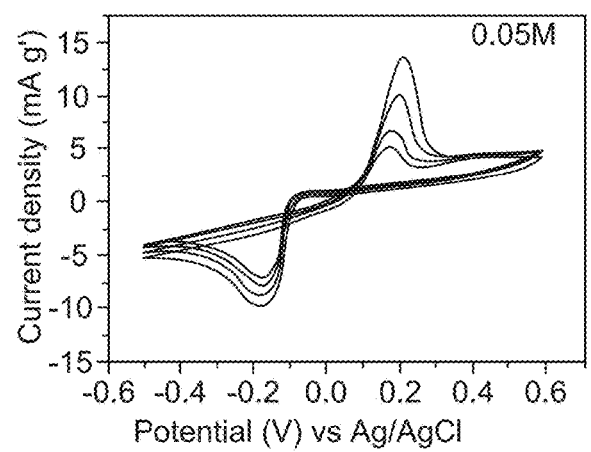
Figure 3C:
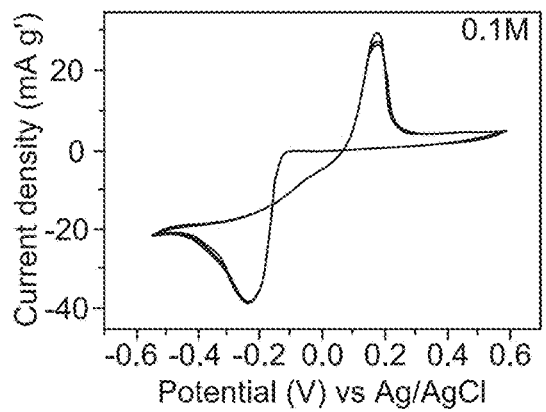
Figure 3D:
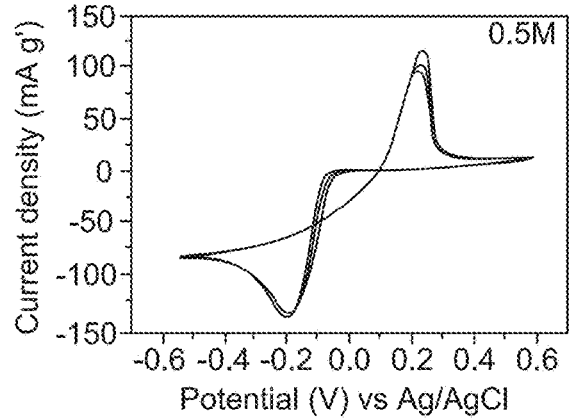

FIGS. 2A-2C show cyclic voltammogram of the stainless steel slide electrode that was used before mesh to achieve stabilized and continuous deposition of Cu coating. Different concentration of $CuSO_4$ solution at pH 1 that was scanned from +0.6 V to −0.5 V and switched back to +0.6 V. Analysis of current density versus potential plot is useful to understand the redox reactions involved in the process. From the cyclic voltammogram, it can be described that at the beginning, there was no current observed, meaning that no reaction occurred on the stainless steel electrode surface. Cathodic current starts to increase at a potential of −1.0 V indicated the nucleation of copper on the stainless steel surface. The current density increased continuously until a maximum current at −0.19 V. From −0.12 V to −0.19V, the cathodic process was controlled by electron transfer, while from −0.15 V to −0.2 V, the process was controlled by mixed kinetic process of electron transfer and mass transport. At this potential range, cathodic peak (Epc) was appeared, which corresponds to maximum copper reduction, according to reaction (1).

$$Cu^{2+} + 2e^- \longrightarrow Cu \qquad (1)$$

After −0.4 V, the current density decreases where the process is controlled by mass transport or diffusion of $Cu^{2+}$. The decrease of current density may be associated with a depletion of copper species at the interface of the stainless steel electrode surface and indicates there is a nucleation and growth mechanism controlled by diffusion. At more negative potential than −0.5 V, the increase of current is attributed to hydrogen evolution reaction (HER), reaction (2), concurrent with the reduction of copper.

$$2H^+ + 2e^- \longrightarrow H_2 \qquad (2)$$

Upon sweep reversal (positive scan direction), two crossovers ($E_3$ and $E_2$) were formed. The $E_3$ potential (E=−0.13 V) is a crossover potential at which nucleation and growth take place with a measurable rate known as the nucleation overpotential, which can be employed to estimate the experimental value of nucleation overpotential. While the $E_2$ potential (E=+0.06 V) is defined as the crossover potential at which copper starts to undergo either reduction (being deposited) or oxidation (dissolved). The difference in potential between the $E_2$ and $E_3$ was due to the nucleation overpotential on stainless steel substrate resulting from the crystallographic misfit between copper and stainless steel. Hence, the presence of the crossover is an indicator for the copper nuclei formation on the stainless steel mesh. At potentials more positive than $E_2$, anodic current increases till the formation of anodic peak ($E_1$) at E=+0.20 V which corresponds to the reaction (1) in the reverse direction. After peak $E_1$, current drops to very low current, demonstrating that the dissolution of metallic copper from the stainless steel mesh surface is almost complete.

In chronoamperometry (CA) experiments, two deposition parameters (applied potential and deposition time) were adjusted to investigate the formation of copper coatings. In order to study the effect of applied potential on the formation of the copper nuclei on the stainless steel mesh, different potentials were chosen based on CV analysis. The applied potential was set at $E_3$ crossover (−0.13 V) until the lower vertex potential −0.5 V. The deposition potentials (−0.142, −0.158, −0.159, −0.113) were obtained for four (0.01, 0.05, 0.1, 0.5 M) concentrations from cyclic voltammogram for stainless steel mesh as working electrode as shown in FIGS. 3A-3D.

Figure 4A:
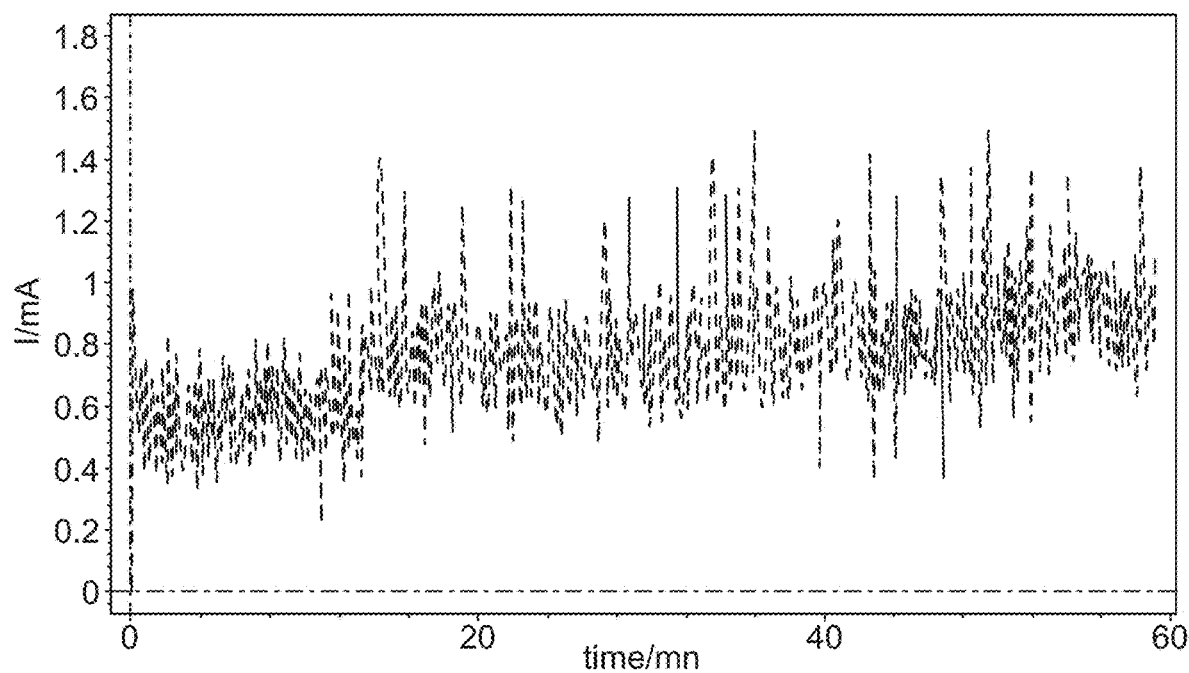
FIGS. 4A-4D are chronoamperometric curves of the deposition of copper metal nanoparticles for 60 min on the stainless steel mesh substrates at different applied potentials and copper sulfate concentrations where
Figure 4B:
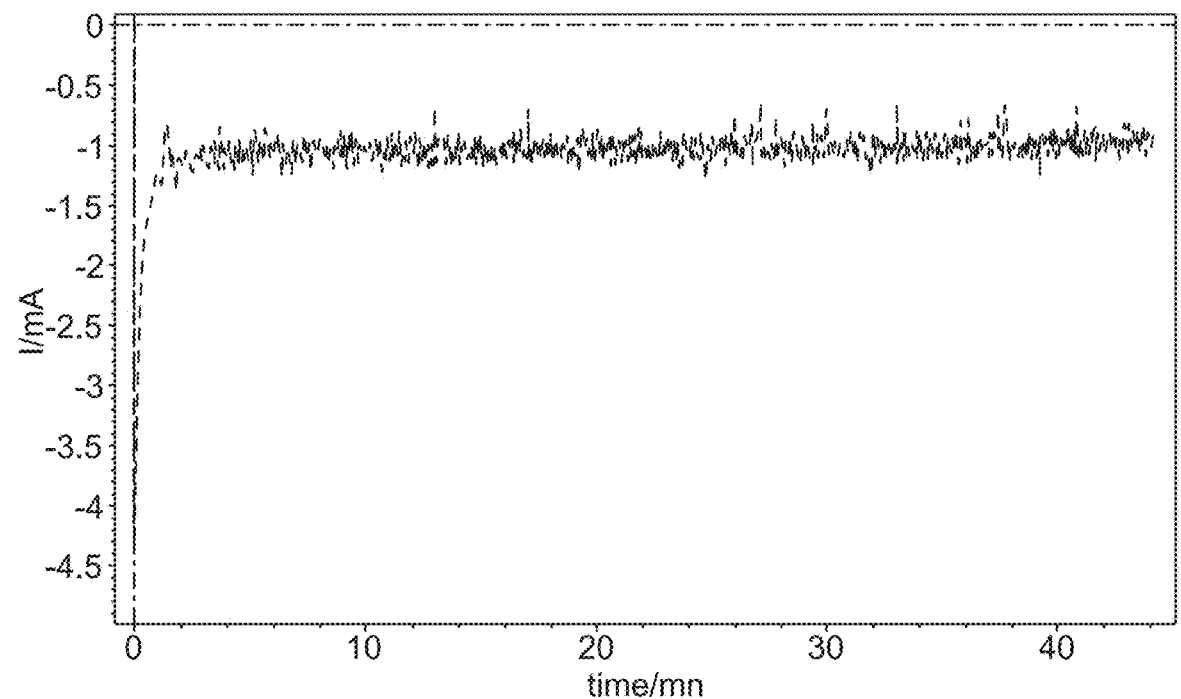
Figure 4C:
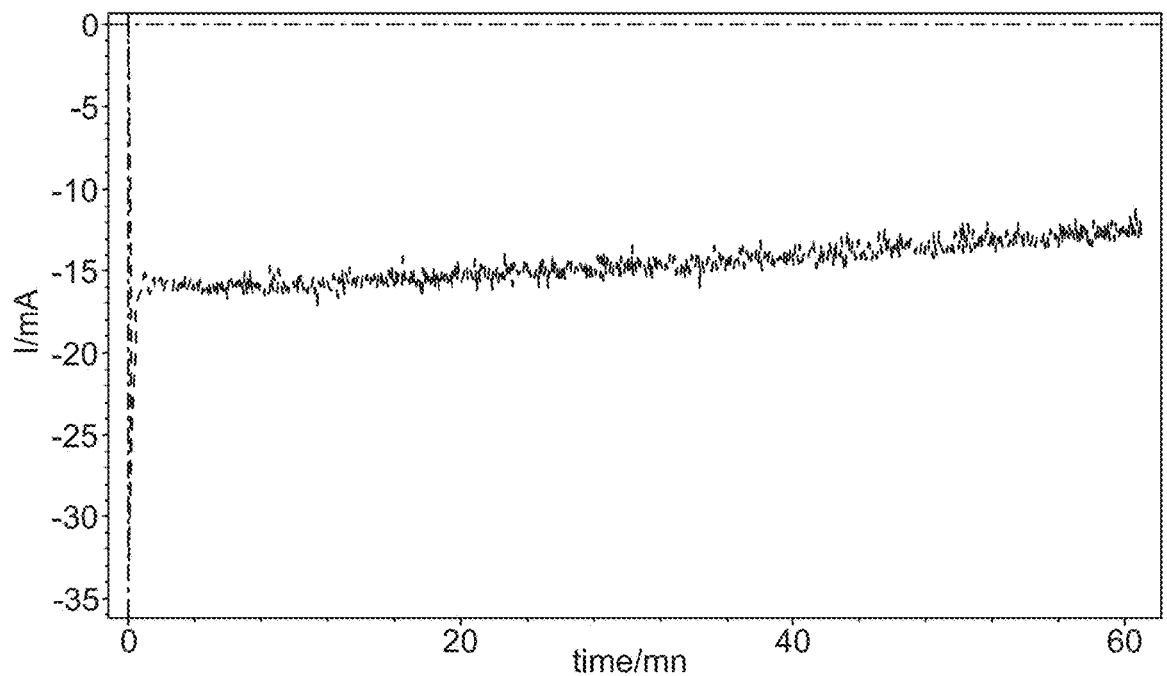
Figure 4D:
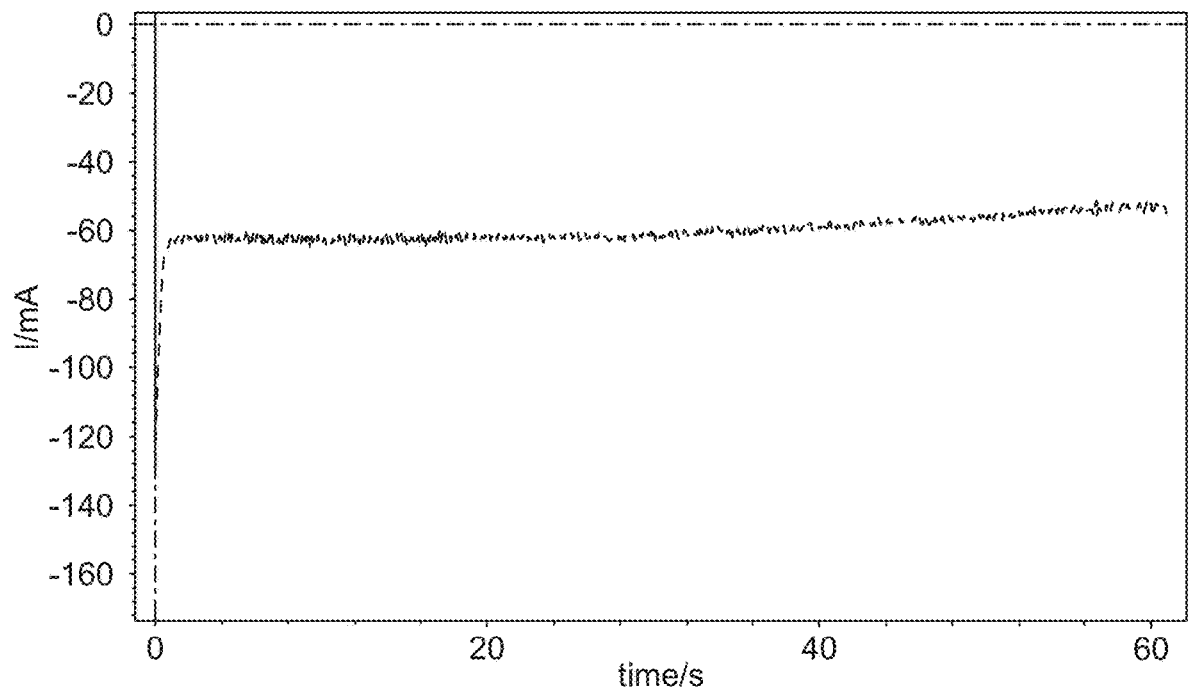

FIGS. 4A-4C show the chronoamperometric curves of the deposition of copper for 60 min on the stainless steel mesh substrate at different applied potentials. It was found that the current density transient trends were similar with a slight difference in current density values. By increasing the applied potential, the current density became higher. The voltage-current relationship follows Ohm's law concept, with negligible the value of resistance.

The first 5 s was ignored since it indicates the charging of the double layer. Initially, the current density decreased gradually in terms of cathodic current which corresponds to the formation of the first nuclei on the stainless steel electrode. This is followed by a stable current obtained after 40 s due to a further nucleation and growth of copper nanoparticles on the stainless steel.

Characterization

Field emission scanning electron microscopy (FESEM, JSM-7600F (JEOL, Tokyo, Japan)) and energy dispersive X-ray microscopy (EDS, Oxford Instruments, High Wycombe, UK) and FIB were used to analyze the deposited nanoparticles of copper on stainless steel slide and mesh.

Figure 5B:
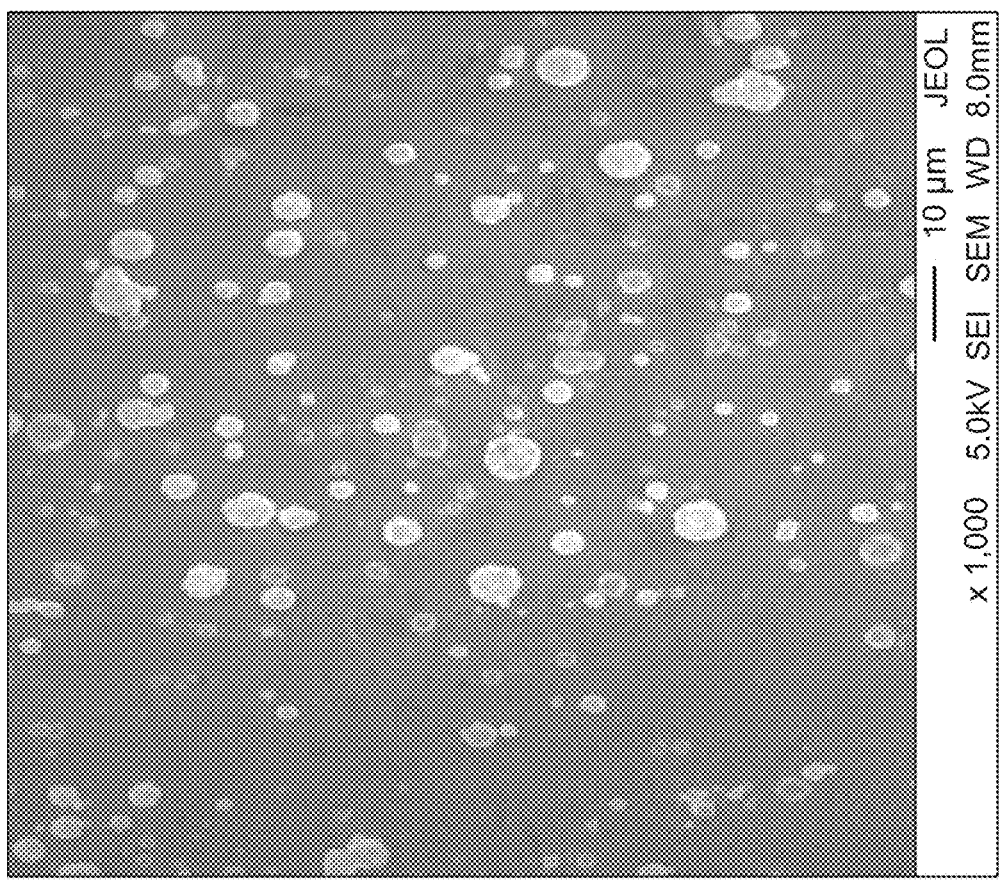
FIGS. 5A-5D are SEM images of the different phases of deposition optimization of on steel slides where
Figure 5A:
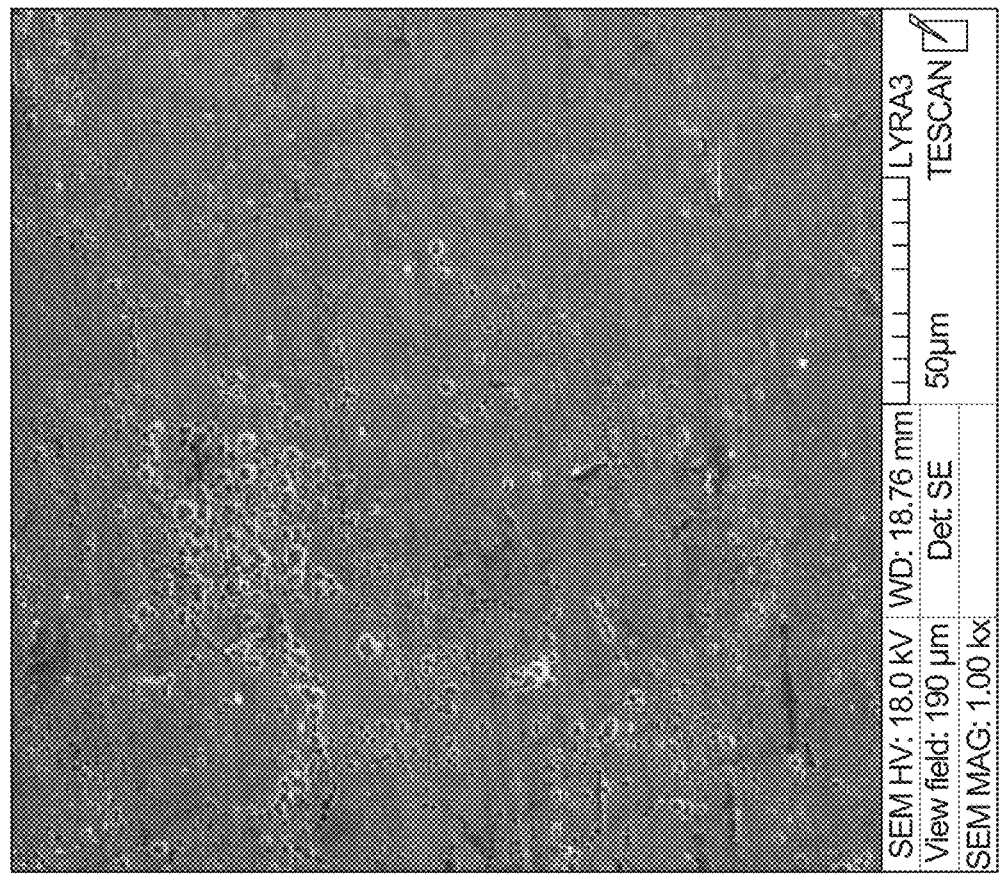
Figure 5D:
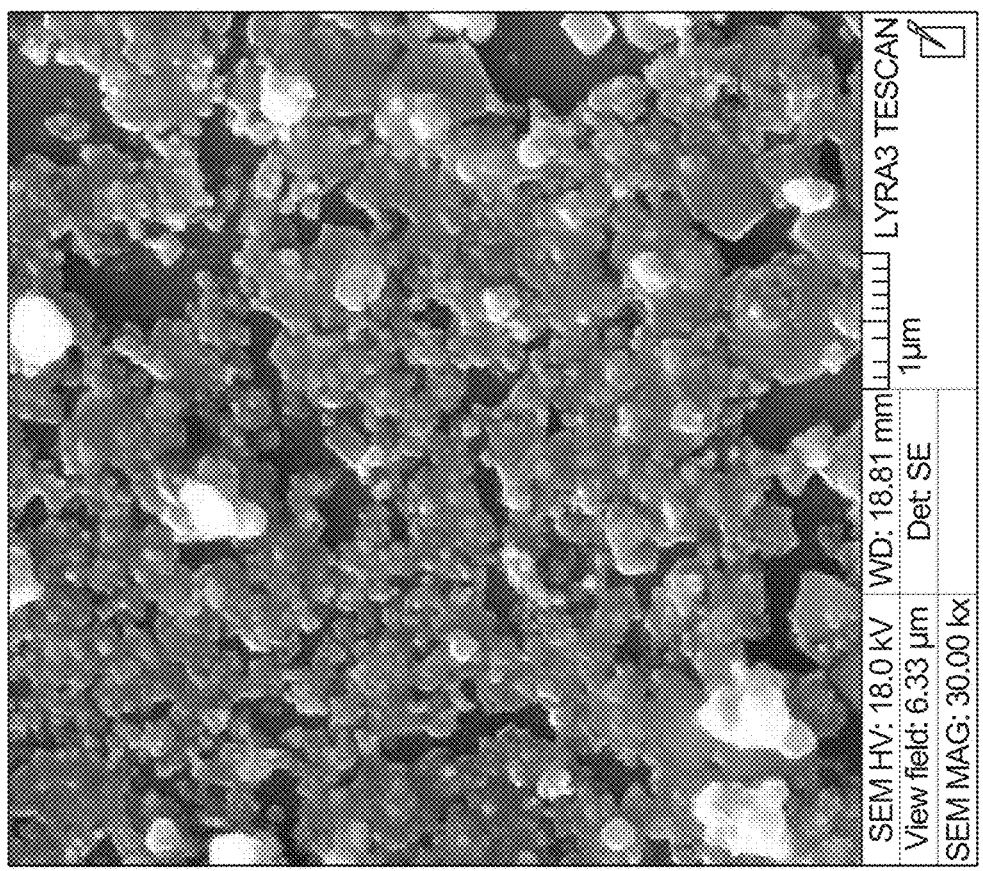
Figure 5C:
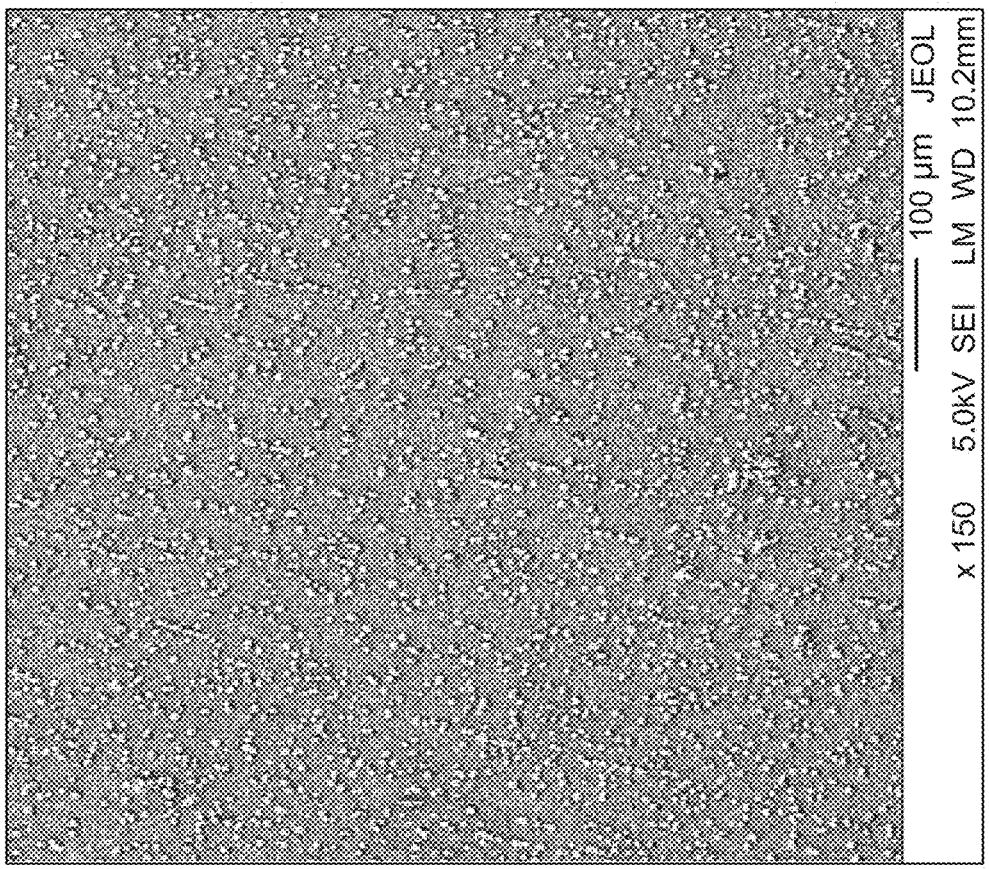
Figure 6B:
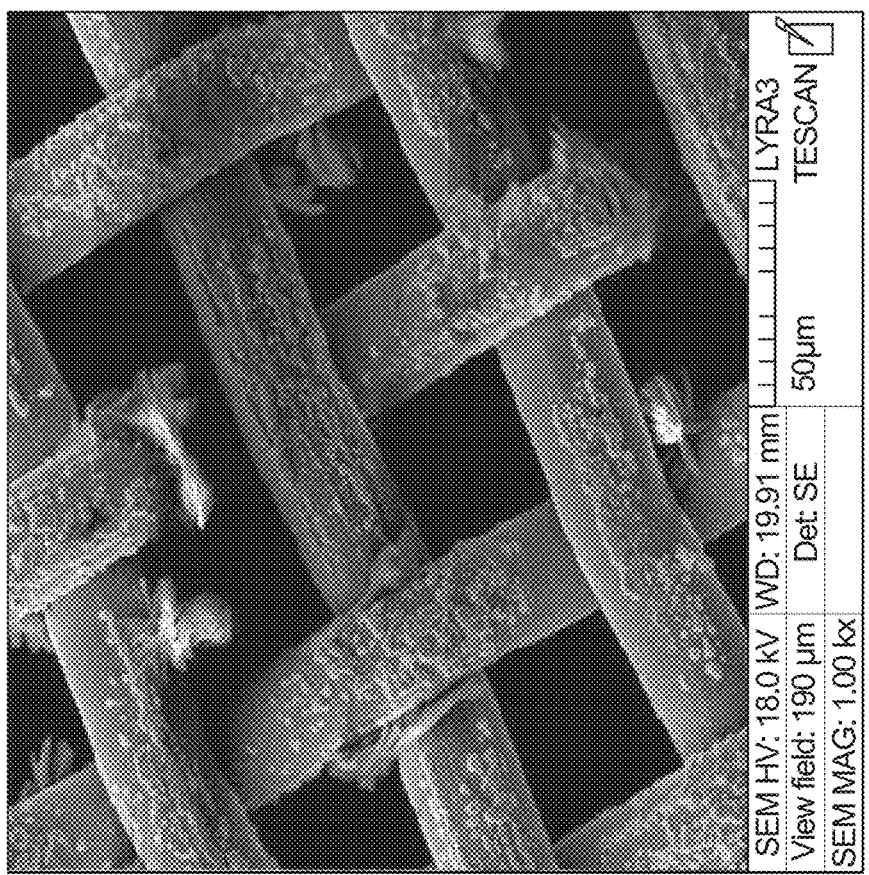
FIGS. 6A-6F are SEM images of metal nanoparticles deposited on stainless steel mesh where
Figure 6A:
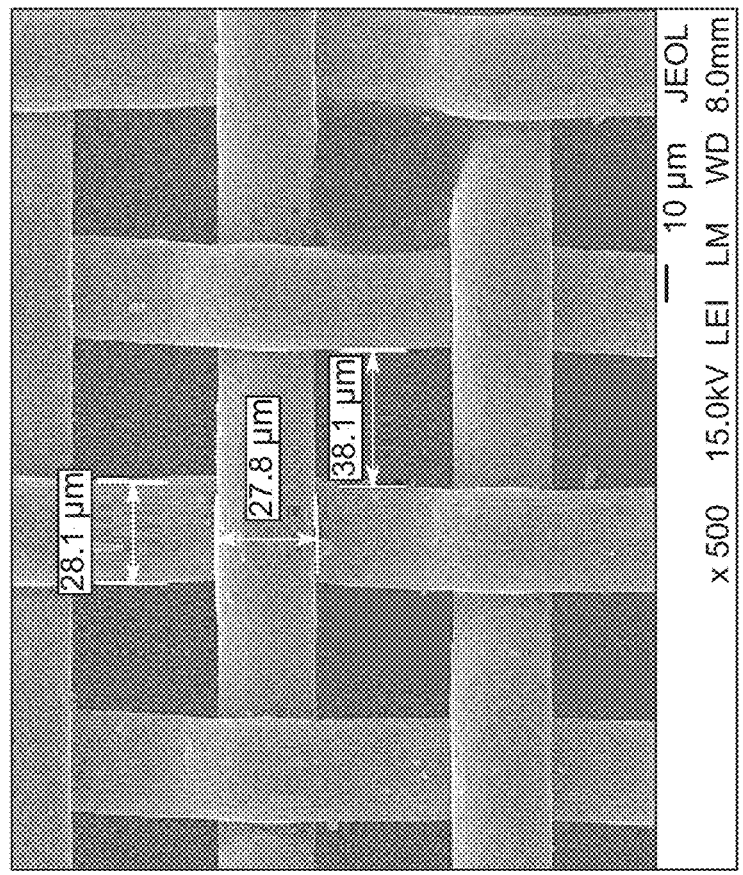
Figure 6D:
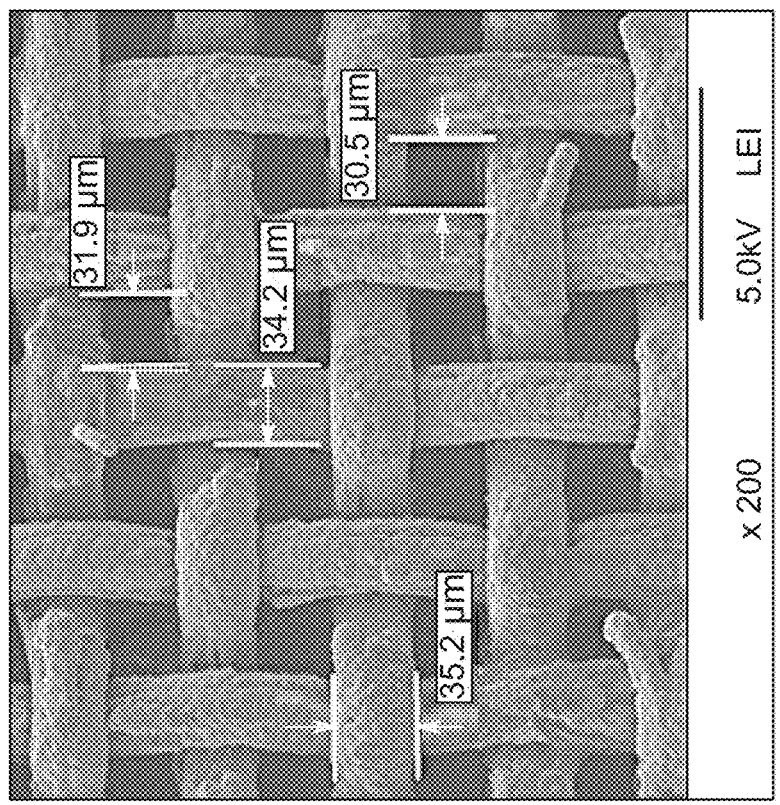
Figure 6C:
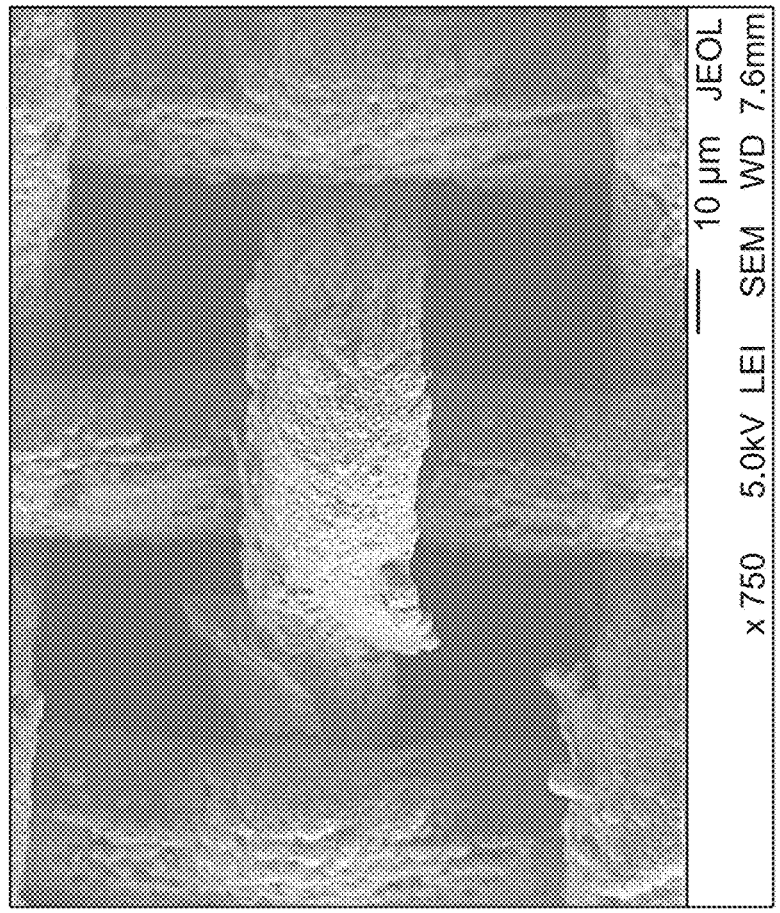
Figure 6F:
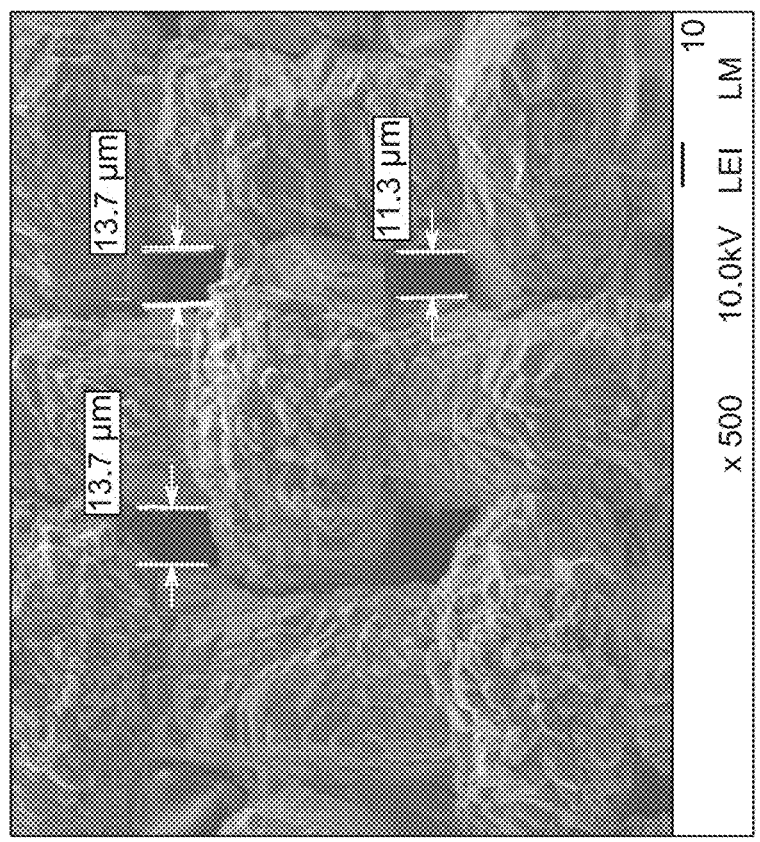
Figure 6E:
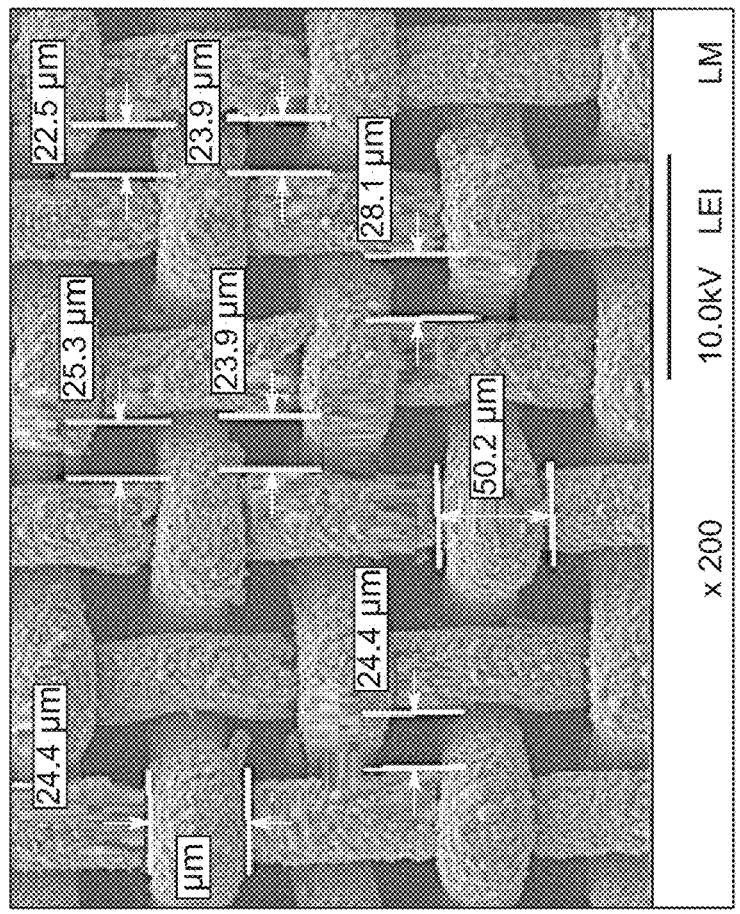
Figure 7A:
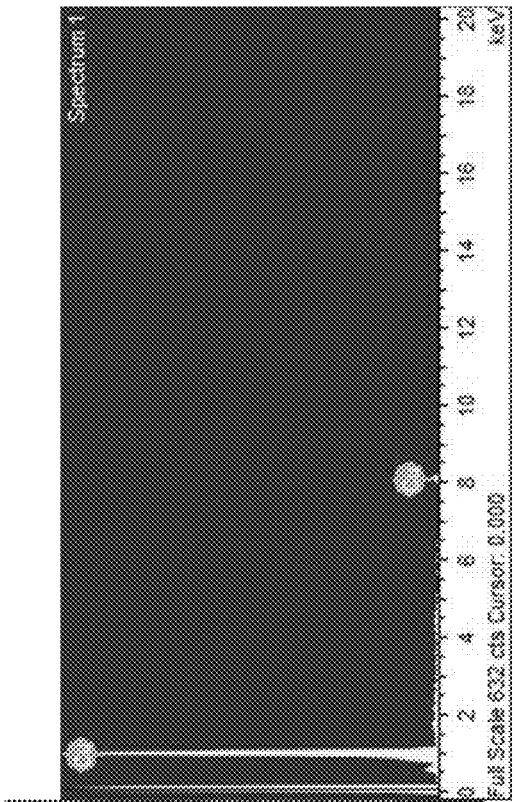
FIGS. 7A-7D show the energy dispersive X-ray spectroscopy (EDS) studies conducted to analyze the composition of the deposited nanoparticles where
Figure 7B:
Figure 7C:
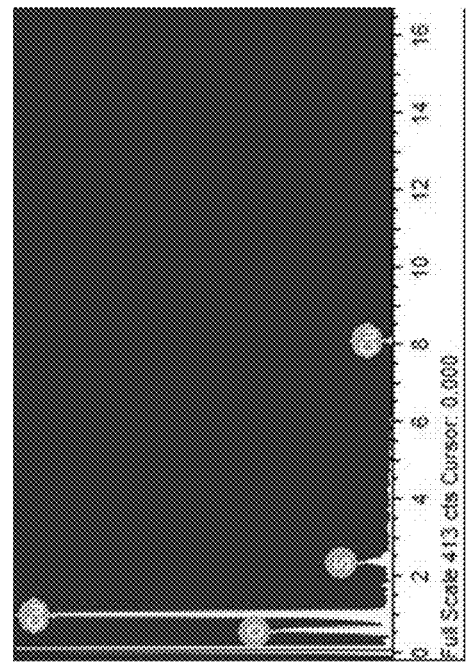
Figure 7D:
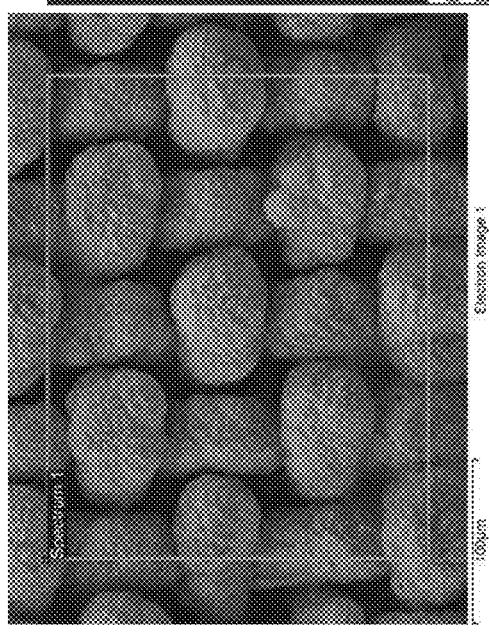

FIGS. 5A-5D show SEM and FIB images of the different phases of deposition optimization of nanoparticle on steel slide. FIG. 5A shows the image of bare stainless slide without coating while FIG. 5B, FIG. 5C, and FIG. 5D show deposition at different concentration. It is clear from the these figures that at a low concentration of copper sulfate solution, very few copper nanoparticles are deposited, barely covering the slide surface, but the deposition is very uniform and with particle size in the nanoscale regime. However, by increasing the deposition time with the low copper sulfate concentration, the required results were not achieved. Therefore, the copper sulfate solution concentration was varied systematically from 0.01 to 0.5 M at different deposition times. FIGS. 6A-6F show the deposition of the copper nanoparticle layer on pure stainless steel mesh. To study the repeatability of deposition experiments at solutions of different concentration were performed similar to get optimized growth of Cu coating on slide. It shows high repeatability on mesh as well. It can be observed very clearly form FIGS. 6A-6F that the thickness of coating layer increased linearly by increasing the concentration of copper sulfate solution. FESEM micrographs show the deposition of copper nanoparticles and required optimization parameters were achieved at 0.5 M $CuSO_4$ solution where successfully interspacing of steel mesh gap was reduced from 38 μm to around 12 μm. FIGS. 7A-7D show the energy dispersive X-ray spectroscopy (EDS) studies conducted to analyze the composition of the deposited nanoparticles. FIGS. 7A-7B suggest that some unreacted copper sulfate may be present in the mesh, possibly trapped in small crevices or other spaces or on the surface of the nanoparticles. However, FIGS. 7C-7D show that the deposited nanoparticles are purely copper, with no other impurity observed.

The invention claimed is:

1. An antimicrobial air treatment device, comprising:
a main body comprising:
an antimicrobial metal nanoparticle mesh, and
one or more filtration layers;
wherein:
the main body is configured as a facemask to fit over a portion of a person's face such that air which is inhaled or exhaled by the person passes through the facemask, and the antimicrobial metal nanoparticle mesh comprises a steel support mesh having a wire size of 15 to 40 μm, and copper nanoparticles having a mean particle size of 250 to 1000 nm, which are present in a nanoparticle layer having a layer thickness of 10 to 16 μm, disposed upon the steel support mesh;
each of the one or more filtration layers comprises a filtration medium; and
the antimicrobial metal nanoparticle mesh has an opening size of 10 to 15 μm.

2. The antimicrobial air treatment device of claim 1, wherein the filtration medium is at least one selected from the group consisting of a woven fabric, a nonwoven fabric, a fiberglass, and a paper.

3. The antimicrobial air treatment device of claim 1, further comprising a filter support layer.

4. The antimicrobial air treatment device of claim 3, wherein the filter support layer is at least one selected from the group consisting of a polymer mesh and a metal mesh.

5. The antimicrobial air treatment device of claim 1, further comprising a stiffening member attached to, disposed upon, or integrated into an upper edge of the main body.

6. The antimicrobial air treatment device of claim 1, further comprising an antimicrobial mesh housing pouch in which the antimicrobial metal nanoparticle mesh is removably contained.

7. The antimicrobial air treatment device of claim 1, further comprising:
an outer protective layer; and
an inner comfort layer.

8. The antimicrobial air treatment device of claim 1, which meets the requirements to be classified as a surgical mask according to ASTM F2100.

9. The antimicrobial air treatment device of claim 1, which meets the requirements to be classified as an N95 respirator.

10. A method of forming the antimicrobial air treatment device of claim 1, the method comprising:

immersing the steel support mesh in a deposition solution; and electrodepositing the copper nanoparticles by applying a voltage to the steel support mesh of −0.25 to −0.05 V vs Ag/AgCl to form the antimicrobial metal nanoparticle mesh;

wherein the deposition solution comprises a copper (II) salt and water and has a pH less than 5.

11. The method of claim 10, wherein the copper (II) salt is copper sulfate.

12. The method of claim 11, wherein the copper sulfate is present in the deposition solution at an initial concentration of 0.25 to 0.75 M.

13. The method of claim 10, wherein the deposition solution has a pH of 0.5 to 1.5.

14. The method of claim 10, wherein the electrodepositing is performed for 15 to 120 minutes.

* * * * *